US012651431B2

(12) United States Patent
Chung et al.

(10) Patent No.: US 12,651,431 B2
(45) Date of Patent: Jun. 9, 2026

(54) DATA PROCESSING DEVICE AND DATA PROCESSING METHOD

(71) Applicant: MEDIT CORP., Seoul (KR)

(72) Inventors: Kang Hoon Chung, Seoul (KR); Ho Taik Lee, Seoul (KR)

(73) Assignee: MEDIT CORP., Seoul (KR)

( * ) Notice: Subject to any disclaimer, the term of this patent is extended or adjusted under 35 U.S.C. 154(b) by 297 days.

(21) Appl. No.: 18/283,569

(22) PCT Filed: Mar. 21, 2022

(86) PCT No.: PCT/KR2022/003895
§ 371 (c)(1),
(2) Date: Sep. 22, 2023

(87) PCT Pub. No.: WO2022/203305
PCT Pub. Date: Sep. 29, 2022

(65) Prior Publication Data
US 2024/0177450 A1 May 30, 2024

(30) Foreign Application Priority Data

Mar. 24, 2021 (KR) ........................ 10-2021-0038283
Sep. 6, 2021 (KR) ........................ 10-2021-0118544

(51) Int. Cl.
*A61C 9/00* (2006.01)
*G06V 10/46* (2022.01)
*G06V 10/75* (2022.01)

(52) U.S. Cl.
CPC .......... *G06V 10/751* (2022.01); *A61C 9/0053* (2013.01); *G06V 10/469* (2022.01)

(58) Field of Classification Search
CPC ............... G06V 10/751; G06V 10/469; G06V 2201/03; G06V 40/10; G06V 10/46;
(Continued)

(56) References Cited

U.S. PATENT DOCUMENTS

| | | | | |
|---|---|---|---|---|
| 2003/0021453 | A1* | 1/2003 | Weise | G06T 17/00 382/128 |
| 2015/0320320 | A1 | 11/2015 | Kopelman et al. | |
| 2017/0032517 | A1 | 2/2017 | Akasaka et al. | |
| 2018/0153409 | A1* | 6/2018 | Kopelman | A61B 5/4547 |
| 2022/0114728 | A1* | 4/2022 | Jussel | A61C 13/0004 |

FOREIGN PATENT DOCUMENTS

| | | |
|---|---|---|
| JP | 2017-207837 A | 11/2017 |
| JP | 2018-185658 A | 11/2018 |
| | (Continued) | |

OTHER PUBLICATIONS

Albdour, Emad A., et al. "A novel in vivo method to evaluate trueness of digital impressions." BMC oral health 18.1 (2018): 117. (Year: 2018).*

(Continued)

*Primary Examiner* — Gregory A Morse
*Assistant Examiner* — Renae A Bitor
(74) *Attorney, Agent, or Firm* — Sughrue Mion, PLLC

(57) ABSTRACT
Disclosed is a data processing method including obtaining deviation information indicating a degree of deviation of target data from reference data, and displaying, on the target data, information corresponding to the deviation information, wherein the obtaining of the deviation information includes obtaining the deviation information by comparing data other than data that deteriorates reliability of the deviation information from among the target data with the reference data.

20 Claims, 15 Drawing Sheets

(58) Field of Classification Search
CPC .................. G06V 20/64; A61C 9/0053; G06T
2207/30036; G06T 7/38
See application file for complete search history.

(56) References Cited

FOREIGN PATENT DOCUMENTS

| KR | 10-2012-0002723 A | 1/2012 |
|----|-------------------|--------|
| KR | 10-2016-0149301 A | 12/2016 |
| KR | 10-2017-0141640 A | 12/2017 |
| KR | 10-2019-0101694 A | 9/2019 |
| KR | 10-2020-0099997 A | 8/2020 |

OTHER PUBLICATIONS

Bohner, Lauren Oliveira Lima, et al. "Computer-aided analysis of digital dental impressions obtained from intraoral and extraoral scanners." The Journal of prosthetic dentistry 118.5 (2017): 617-623. (Year: 2017).*

3D Systems: Geomagic Control X Tutorial 3D Compare; https://youtu.be/gprpbU279Pk?si=GWElpWrgIDPDf2BF (Year: 2017).*

Korean Office Action for KR No. 10-2021-0118544 dated May 22, 2023.

International Search Report for PCT/KR2022/003895 dated Jun. 29, 2022.

Lauren Olivera Lima Bohner, et al. "Computer-aided analysis of digital dental impressions obtained from intraoral and extraoral scanners", The Journal of Prosthetic Dentistry, Apr. 3, 2017, vol. 118, No. 5, pp. 617-623 (7 pages).

3D Systems, "Geomagic Control X Tutorial 3D Compare", Aug. 30, 2017, https://www.youtube.com/watch?app=desktop&v=gprpbU279Pk&t=170s, (2 pages).

Extended European Search Report dated Feb. 25, 2025 in Application No. 22776007.1.

* cited by examiner

710

720

810

820

DATA PROCESSING DEVICE AND DATA PROCESSING METHOD

CROSS REFERENCE TO RELATED APPLICATIONS

This application is a National Stage of International Application No. PCT/KR2022/003895 filed Mar. 21, 2022, claiming priority based on Korean Patent Application No. 10-2021-0038283 filed Mar. 24, 2021 and Korean Patent Application No. 10-2021-0118544 filed Sep. 6, 2021.

TECHNICAL FIELD

The disclosed embodiments relate to a data processing device and a data processing method, and more particularly, to a device and method for processing an intraoral image.

BACKGROUND ART

Three-dimensional scanners have been used for dental treatment of patients. Three-dimensional scanners may be of a handheld type, which may be inserted in and withdrawn from a patient's oral cavity, or a table scanner type, which may scan a plaster cast placed on a table while rotating the table.

A computing device such as a personal computer (PC) connected to a three-dimensional scanner may generate a three-dimensional intraoral image by using raw data obtained by the three-dimensional scanner.

In some cases, a user such as a dentist may want to compare a plurality of three-dimensional intraoral images with each other by using a computing device. In this case, when low-reliability data is included in the three-dimensional intraoral images to be compared, the reliability of a result of comparing the plurality of three-dimensional intraoral images with each other also decreases. Thus, a method and device capable of more accurately comparing a plurality of three-dimensional intraoral images with each other are required.

DESCRIPTION OF EMBODIMENTS

Solution to Problem

A data processing method according to an embodiment includes obtaining deviation information indicating a degree of deviation of target data from reference data, and displaying, on the target data, information corresponding to the deviation information, wherein the obtaining of the deviation information includes obtaining the deviation information by comparing data other than data that deteriorates reliability of the deviation information from among the target data with the reference data.

MODE OF DISCLOSURE

Figure 1:
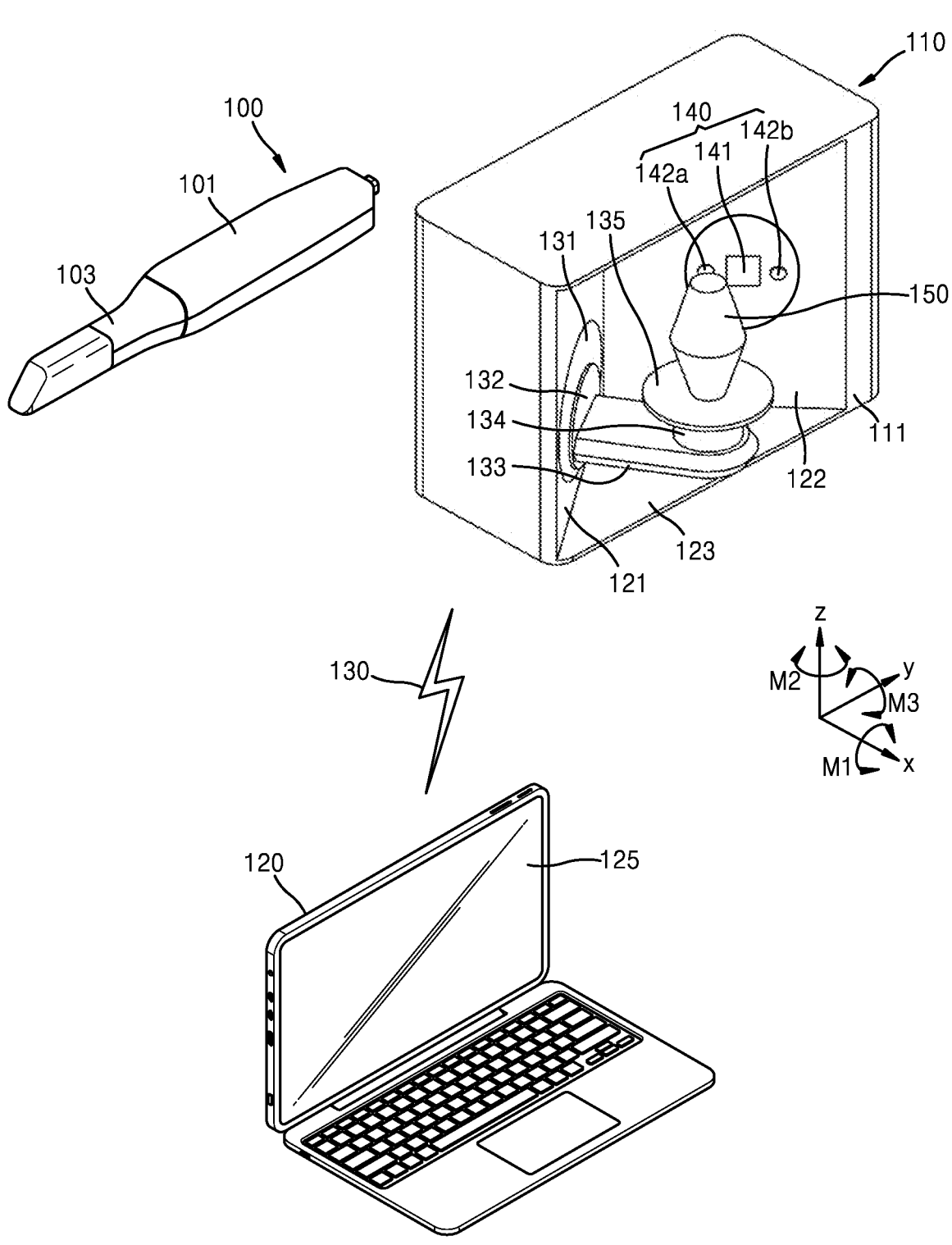
FIG. 1 is a diagram for describing an intraoral image processing system according to an embodiment.

In an embodiment, the obtaining of the deviation information may further include obtaining, as the deviation information, a distance to a second point of the reference data that intersects a normal vector, by projecting the normal vector from a first point of the target data.

In an embodiment, the method may further include identifying whether the first point is included in a target data boundary region, and based on the first point being included in the target data boundary region, identifying data of the first point as data that deteriorates the reliability of the deviation information.

In an embodiment, the method may further include identifying whether the second point that intersects the normal vector is present in the reference data, wherein the identifying of whether the first point is included in the target data boundary region may include, based on the second point being present in the reference data, identifying whether the first point is included in the target data boundary region.

In an embodiment, the obtaining of the deviation information may further include obtaining, as the deviation information, a distance between the first point of the target data and a third point of the reference data that is at a shortest distance from the first point of the target data.

In an embodiment, the obtaining of the deviation information may further include identifying whether the third point is included in a reference data boundary region, and based on the third point being included in the reference data boundary region, identifying data of the first point of the target data as the data that deteriorates the reliability of the deviation information.

In an embodiment, the method may further include outputting a user interface screen for receiving a selection on whether to exclude the data that deteriorates the reliability of the deviation information, when obtaining the deviation information, wherein the obtaining of the deviation information may further include, in response to receiving a selection to exclude the data that deteriorates the reliability of the deviation information on the user interface screen, excluding the data that deteriorates the reliability of the deviation information from the target data.

In an embodiment, the method may further include outputting a user interface screen for receiving a selection for a method of obtaining the deviation information, wherein the obtaining of the deviation information may further include excluding the data that deteriorates the reliability of the deviation information from the target data, according to the method of obtaining the deviation information, which is selected on the user interface screen, and the method of obtaining the deviation information may include at least one of a method using a normal vector and a method using a shortest distance.

In an embodiment, the deviation information may include statistical properties of a distance distribution between the target data and the reference data, and the statistical properties of the distance distribution may include at least one of a minimum, a maximum, a median, an average, an absolute average, a mode, a range, and a variance of the distance distribution.

In an embodiment, the target data may include a vertex, the displaying of the information corresponding to the deviation information on the target data may include displaying each vertex of the target data used to obtain the deviation information, in a color corresponding to the deviation information for the vertex, and the method may further include displaying a color of a vertex of the data that deteriorates the reliability of the deviation information in a predetermined color different from the color corresponding to the deviation information.

A data processing device according to an embodiment includes a display, and a processor configured to execute one or more instructions to obtain deviation information indicating a degree of deviation of the target data from reference data by comparing the target data other than data that deteriorates reliability of the deviation information, with the reference data, and control the display to display, on the target data, information corresponding to the deviation information.

In the present specification, the principle of the present disclosure is described and embodiments are provided in such a manner that the scope of the present disclosure becomes apparent and the present disclosure may be carried out by those of skill in the art to which the present disclosure pertains. The disclosed embodiments may be implemented in various forms.

Like reference numerals denote like elements throughout the present specification. The present specification does not describe all elements of embodiments, and general content in the art to which the present disclosure pertains or identical content between the embodiments will be omitted. The terms 'part' and 'portion' as used herein may be embodied as software or hardware, and a plurality of 'parts' may be embodied as a single unit or element, while a single 'part' may include a plurality of elements, according to embodiments. Hereinafter, an operating principle and embodiments of the present disclosure will be described with reference to the accompanying drawings.

In the present specification, an image may include an image representing at least one tooth, an oral cavity including at least one tooth, or a plaster cast of an oral cavity (hereinafter, referred to as an 'intraoral image').

In addition, in the present specification, an image may include a two-dimensional image of an object, or a three-dimensional intraoral image representing an object in three dimensions. In addition, the three-dimensional intraoral image may be generated by modeling the structure of the oral cavity in three dimensions based on raw data, and thus may be referred to as a three-dimensional intraoral model. Also, the three-dimensional intraoral model may be referred to as a three-dimensional scan model or three-dimensional scan data.

Hereinafter, in the present specification, the term 'intraoral image' will be used as a generic term for a model or image representing an oral cavity in two dimensions or three dimensions.

In addition, in the present specification, data may refer to information necessary for representing an object in two dimensions or three dimensions, for example, raw data obtained by using at least one camera.

In detail, the raw data is data obtained to generate an intraoral image, and may be data (e.g., two-dimensional data) obtained by at least one image sensor included in a three-dimensional scanner when an object is scanned by using the three-dimensional scanner. Raw data obtained by a three-dimensional scanner may also be referred to as two-dimensional image data. Raw data may refer to two-dimensional images from different viewpoints obtained by a plurality of cameras when an object is scanned by using a three-dimensional scanner.

Although it is described above that the raw data is two-dimensional images, but is not limited thereto and may also be three-dimensional image data.

In the present specification, an object refers to an object to be photographed and may include a part of a human body or a model of a part of a human body. The object may include an oral cavity, a plaster cast or impression of an oral cavity, an artificial structure that is insertable into an oral cavity, or a plaster cast or impression of an artificial structure. For example, the object may be a tooth, gingiva, a plaster cast or impression of a tooth or gingiva, and/or may include an artificial structure insertable into an oral cavity, or a plaster cast or impression of such an artificial structure. Here, the artificial structure insertable into an oral cavity may include, for example, at least one of an orthodontic device, an implant, a crown, an inlay, an onlay, an artificial tooth, and an orthodontic auxiliary tool to be inserted into an oral cavity. In addition, the orthodontic device may include at least one of a bracket, an attachment, an orthodontic screw, a lingual orthodontic device, and a removable orthodontic retainer.

In various situations, a user such as a dentist may want to compare a plurality of three-dimensional intraoral images with each other. For example, the user may want to compare a patient's teeth from one year ago with the patient's teeth from a year later in order to check the condition of the patient's teeth. Alternatively, the user may want to compare the patient's dentition before orthodontic treatment with the patient's dentition after orthodontic treatment to check a change in the state of the dentition. Alternatively, the user may want to compare the patient's tooth before and after preparation when obtaining a preparation tooth to secure a space in which a prosthesis is to be placed on the patient's tooth. Alternatively, the user may want to compare a three-dimensional intraoral image obtained by using a handheld three-dimensional scanner with a three-dimensional intraoral image obtained by using another scanner, for example, a table-type three-dimensional scanner, in order to check the device precision of the scanners.

In such various situations, the user may want to use a result of comparing a plurality of three-dimensional intraoral images with each other. Here, when low-reliability data is included in the three-dimensional intraoral image to be compared, the reliability of a result of comparing the plurality of three-dimensional intraoral images with each other also decreases.

The disclosed embodiment is to overcome the above-mentioned issues, and is to provide a method and device for more accurately comparing a plurality of three-dimensional intraoral images with each other by excluding low-reliability data from the three-dimensional intraoral images to be compared with each other.

Hereinafter, embodiments will be described in detail with reference to the drawings.

FIG. 1 is a diagram for describing an intraoral image processing system according to an embodiment.

Referring to FIG. 1, the intraoral image processing system may include three-dimensional scanners 100 and 110 and a data processing device 120 connected to the three-dimensional scanners 100 and 110 through a communication network 130.

The three-dimensional scanners 100 and 110 may be medical devices for obtaining an image of an object.

The three-dimensional scanners 100 and 110 may obtain an image of at least one of an oral cavity, an artificial structure, or a plaster cast of an oral cavity or an artificial structure.

The three-dimensional scanners 100 and 110 may include at least one of an intraoral scanner 100 and a table scanner 110.

In an embodiment, the three-dimensional scanners 100 and 110 may include the intraoral scanner 100. The intraoral scanner 100 may be a handheld scanner for scanning an oral cavity while being held and moved by a user. The intraoral scanner 100 may obtain an image of an oral cavity including at least one tooth by being inserted into the oral cavity and scanning teeth in a contactless manner.

The intraoral scanner 100 may include a main body 101 and a tip 103. The main body 101 may include a light emitter (not shown) configured to project light, and a camera (not shown) configured to obtain an image by photographing an object.

The tip 103 is a part to be inserted into an oral cavity, and may be detachably mounted on the main body 101. The tip 103 may include an optical path changer, such as a mirror, to direct light emitted from the main body 101 toward an object, and direct light received from the object toward the main body 101.

The intraoral scanner 100 may obtain, as raw data, surface information about an object, in order to image the surface of at least one of a tooth, gingiva, and an artificial structure (e.g., an orthodontic device including a bracket and a wire, an implant, an artificial tooth, an orthodontic auxiliary tool inserted into the oral cavity, etc.).

In an embodiment, the three-dimensional scanners 100 and 110 may include the table scanner 110. The table scanner 110 may be configured to obtain surface information about an object 150 as raw data by scanning the object 150 while rotating a table 135. The table scanner 110 may scan the surface of the object 150, such as a plaster cast or impression of an oral cavity, an artificial structure that is insertable into an oral cavity, or a plaster cast or impression of an artificial structure.

The table scanner 110 may include an inner space recessed toward the inside of a housing 111. The inner space may be formed by a first inner surface 121, a second inner surface 122, a third inner surface 123 (bottom surface), and a fourth inner surface (not shown) (top surface).

A moving portion for holding and moving the object 150 may be formed in the inner space 120. The moving portion may vertically move in the z-axis direction. The moving portion may include a fixed base 131 fixed to the first inner surface 121 and connected to a first rotating portion 132, the first rotating portion 132 that is rotatable in a first rotation direction M1 around a central axis on a point on the fixed base 131, for example, around the x-axis, and a beam portion 133 connected to the first rotating portion 132 and protruding from the first rotating portion 132. The beam portion 133 may be extended or shortened in the x-axis direction.

A cylindrical second rotating portion 134 that is rotatable in a second rotation direction M2 around the z-axis may be coupled to one end of the beam portion 133. The table 135 that rotates together with the second rotating portion 134 may be formed on one surface of the second rotating portion 134.

An optical portion 140 may be formed on the second inner surface 122 in the inner space 120 of the housing 111. The optical portion 140 includes a light projection portion 141 configured to project pattern light onto the object 150, and one or more cameras 142a and 142b configured to receive the light reflected from the object 150 to obtain a plurality of two-dimensional frames. The optical portion 140 may further include a second rotating portion (not shown) that rotates around the center of the light projection portion 141 as a rotation axis while being coupled to the second inner surface 122. The second rotating portion may rotate the light projection portion 141, the first camera 142a, and the second camera 142b in a third rotation direction M3.

The three-dimensional scanners 100 and 110 may transmit the obtained raw data to the data processing device 120 through the communication network 130.

The data processing device 120 may be connected to the three-dimensional scanners 100 and 110 through the wired or wireless communication network 130. The data processing device 120 may be any electronic device capable of receiving raw data from the three-dimensional scanners 100 and 110 and generating, processing, displaying, and/or transmitting an intraoral image based on the received raw data. For example, the data processing device 120 may be a computing device such as a smart phone, a laptop computer, a desktop computer, a personal digital assistant (PDA), or a tablet personal computer (PC), but is not limited thereto. In addition, the data processing device 120 may be in the form of a server (or a server device) or the like for processing an intraoral image.

The data processing device 120 may generate a three-dimensional intraoral image or additional information by processing a two-dimensional image data based on two-dimensional image data received from the three-dimensional scanners 100 and 110. The data processing device 120 may display a three-dimensional intraoral image and/or additional information through a display 125, or output or transmit the three-dimensional intraoral image and/or the additional information to an external device.

As another example, the three-dimensional scanners 100 and 110 may obtain raw data through intraoral scanning, process the obtained raw data to generate three-dimensional data, and transmit the three-dimensional data to the data processing device 120.

In an embodiment, the three-dimensional scanners 100 and 110 may project pattern light onto an object, scan the object onto which the pattern light is projected, and obtain three-dimensional data representing the shape of the object by using the principle of triangulation based on distortion of a pattern.

In an embodiment, the three-dimensional scanners 100 and 110 may obtain three-dimensional data of the object by using a confocal method. The confocal method is a non-destructive optical imaging technique for three-dimensional surface measurement, and may obtain an optically sectioned image with a high spatial resolution by using a pinhole structure. The three-dimensional scanners 100 and 110 may obtain three-dimensional data by stacking two-dimensional images obtained in an axial direction.

However, this is an embodiment, and the three-dimensional scanners 100 and 110 may obtain three-dimensional data from raw data by using various methods other than the above method, and transmit the obtained three-dimensional data to the data processing device 120. The data processing device 120 may analyze, process, display, and/or transmit the received three-dimensional data.

In an embodiment, the data processing device 120 may obtain a plurality of three-dimensional intraoral images. The user may compare the plurality of three-dimensional intraoral images with each other by using the data processing device 120. To this end, the user may select two pieces of data to be compared with each other from among the plurality of three-dimensional intraoral images by using the data processing device 120. The two pieces of data to be compared with each other may be referred to as reference data and target data, respectively.

In an embodiment, the reference data may refer to basic standard data. That is, the reference data may refer to data that may be used as a standard for comparison with the target data.

In an embodiment, the target data may refer to data that is a target to be compared. That is, the target data may refer to a target for which a degree of deviation from the reference data is to be identified.

In an embodiment, the data processing device 120 may obtain deviation information indicating the degree of deviation of the target data from the reference data.

In an embodiment, the data processing device 120 may exclude data that deteriorates/reduces the reliability of the deviation information from the target data.

In an embodiment, the data processing device 120 may obtain deviation information by comparing the target data from which the data that deteriorates the reliability of the deviation information is excluded, with the reference data.

In an embodiment, the data processing device 120 may display the deviation information on the target data. For example, the data processing device 120 may display and output the deviation information as a color map with colors corresponding to the deviation information, on the target data.

Figure 2:
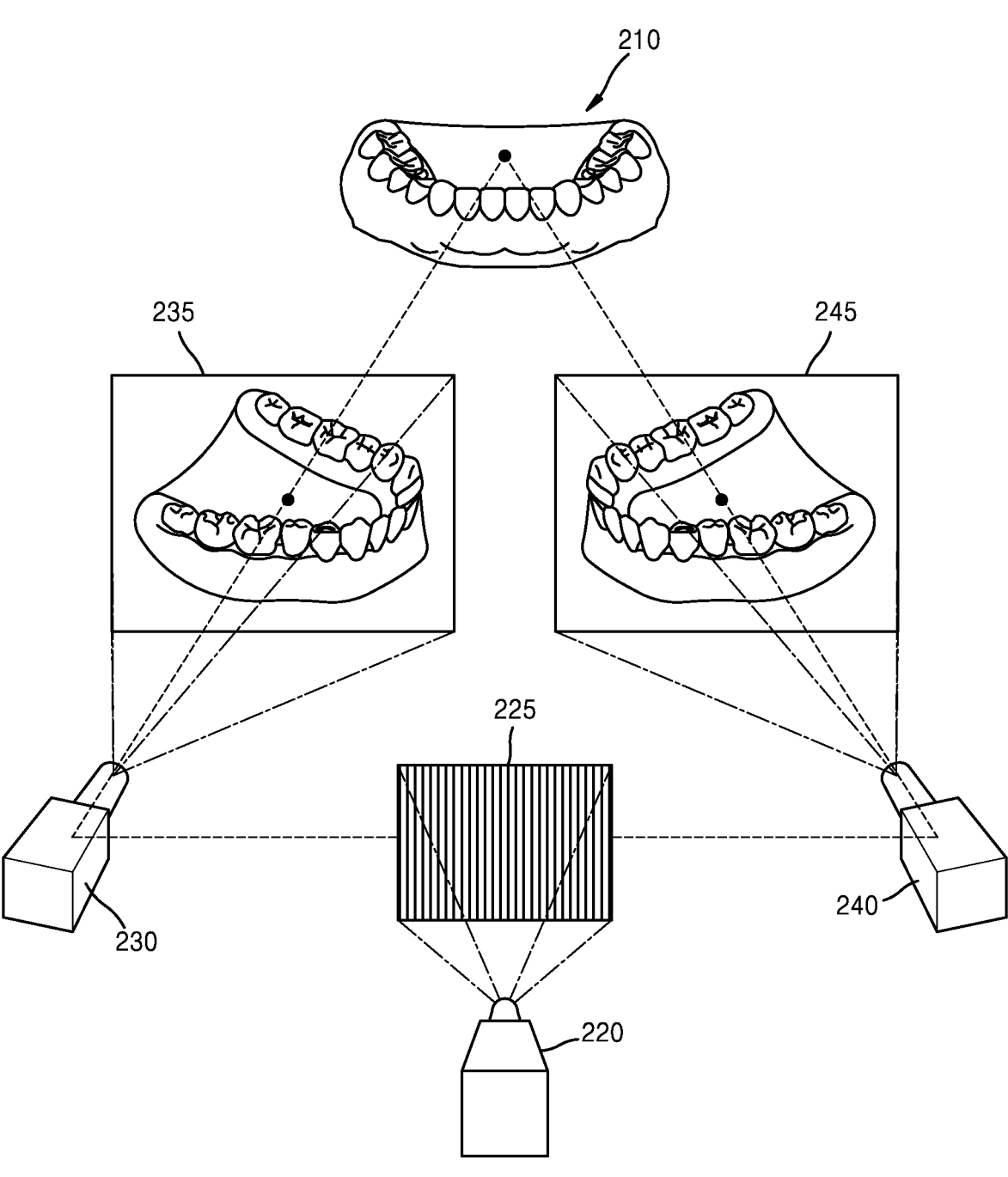
FIG. 2 is a diagram for describing a method, performed by a three-dimensional scanner, of obtaining surface data, according to an embodiment.

FIG. 2 is a diagram for describing a method, performed by a three-dimensional scanner, of obtaining surface data, according to an embodiment.

In an embodiment, the three-dimensional scanners 100 and 110 may obtain three-dimensional data of an object by using various methods. For example, the three-dimensional scanners 100 and 110 may obtain the three-dimensional data of the object by using a confocal method. The confocal method is a method of obtaining three-dimensional information about an object based on the position of a point identified by using a maximum intensity of light reflected according to the refractive index of a lens that passes light projected onto the object. The three-dimensional scanners 100 and 110 may obtain an optically sectioned image with a high spatial resolution by using a pinhole structure. The three-dimensional scanners 100 and 110 may obtain three-dimensional data by stacking two-dimensional images obtained in an axial direction.

Alternatively, in an embodiment, the three-dimensional scanners 100 and 110 may obtain three-dimensional information about the object by using an optical triangulation technique. The optical triangulation technique is for obtaining three-dimensional information about an object through triangulation by using a triangle formed by a light source, an object irradiated with light emitted from the light source, and an image sensor to which light reflected from the object is input. However, this is an example, and the three-dimensional scanners 100 and 110 may obtain three-dimensional data in various ways other than the confocal method or the light triangulation method.

Hereinafter, as an embodiment, a method, performed by the three-dimensional scanners 100 and 110, of obtaining three-dimensional data of an object by using an optical triangulation method will be described in more detail.

In an embodiment, the three-dimensional scanners 100 and 110 may obtain images by using at least one camera and obtain three-dimensional data based on the obtained images.

In FIG. 2, the three-dimensional scanners 100 and 110 may be optical three-dimensional scanners. The three-dimensional scanners 100 and 110 may use structured light with stereo vision to obtain three-dimensional data of the surface of an object 210.

The three-dimensional scanners 100 and 110 may include two or more cameras 230 and 240 and a projector 220 capable of projecting structured light 225.

The three-dimensional scanners 100 and 110 may project the structured light 225 to the object 210, and the L camera 230 corresponding to the left field of view and the R camera 240 corresponding to the right field of view may obtain an L image 235 corresponding to the left field of view and an R image 245 corresponding to the right field of view, respectively. The L image 235 and the R image 245 may be reconstructed into a three-dimensional image frame representing the surface of the object 210.

The three-dimensional scanners 100 and 110 may continuously obtain two-dimensional image frames including the L image 235 and the R image 245 of the object 210. The three-dimensional scanners 100 and 110 or the data processing device 120 may obtain a three-dimensional image frame representing the surface shape of the object 210 from the two-dimensional image frames including the L image 235 and the R image 245. FIG. 2 illustrates that the three-dimensional scanners 100 and 110 obtain three-dimensional data from two images obtained by using the two cameras 230 and 240, respectively, but this is an example, and the three-dimensional scanners 100 and 110 may obtain an image by using only one of the two cameras 230 and 240.

The three-dimensional scanners 100 and 110 may obtain a plurality of two-dimensional frames by scanning the periphery of the object 210 at regular time intervals (e.g., 10 to 30 frames per second). The three-dimensional scanners 100 and 110 or the data processing device 120 may obtain a plurality of three-dimensional image frames from a plurality of two-dimensional image frames.

The data processing device 120 may obtain a three-dimensional intraoral model of the entire object 210 by merging or aligning the plurality of three-dimensional image frames.

Figure 3:
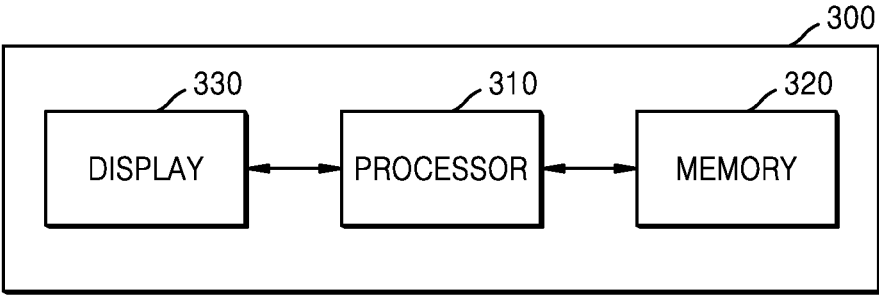
FIG. 3 is an internal block diagram of a data processing device according to an embodiment.

FIG. 3 is an internal block diagram of a data processing device according to an embodiment.

In an embodiment, a data processing device 300 may also be referred to as an intraoral image processing device.

The data processing device 300 of FIG. 3 may be an embodiment of the data processing device 120 of FIG. 1. Thus, the descriptions of the data processing device 120 of FIG. 1 provided above will be omitted.

The data processing device 300 may be an electronic device capable of generating, processing, processing, displaying, and/or transmitting an intraoral image by using raw data received from the three-dimensional scanners 100 and 110.

Referring to FIG. 3, the data processing device 300 may include a processor 310, a memory 320, and a display 330.

In detail, the data processing device 300 may include the display 330, the memory 320 storing one or more instructions, and the processor 310 configured to execute the one or more instructions stored in the memory.

The processor 310 may execute the one or more instructions to exclude data that deteriorates the reliability of deviation information from target data.

In an embodiment, the deviation information may refer to information indicating a degree of deviation of the target data from reference data.

In an embodiment, the data that deteriorates/reduces the reliability of the deviation information may refer to data that cannot be used to accurately obtain deviation information, among data included in the target data. That is, when the reliability of the deviation information is deteriorated/reduced as particular data among the data included in the target data is used to obtain deviation information, the particular data may be referred to as data that deteriorates the reliability of the deviation information.

In an embodiment, the data that deteriorates the reliability of the deviation information may vary depending on a method of obtaining the deviation information.

For example, when the processor 310 obtains deviation information by using a normal vector, the processor 310 may identify points included in a target data boundary region as data that deteriorates the reliability of the deviation information. This is because, when the target data is not a closed surface, points included in a boundary region of the target data do not have an accurate normal vector, and thus, the distance between a point included in the boundary region of the target data and a point on the reference data that intersects an inaccurate normal vector projected from the point included in the boundary region also deteriorates in reliability.

For example, when the processor 310 obtains deviation information by using a shortest distance, and a point closest to a point of the target data is included in the boundary region of the reference data, the processor 310 may identify the point of the target data as data that deteriorates the reliability of the deviation information. This is because, when a plurality of points included in the target data are mapped to points in the boundary region of the reference data, the reliability of the deviation information obtained from the plurality of points included in the target data is deteriorated.

The processor 310 may obtain deviation information indicating a degree of deviation of the target data from the reference data by comparing target data in which the data that deteriorates the reliability of the deviation information is excluded from calculation targets, with the reference data. That is, the processor 310 may prevent the reliability of the deviation information from deteriorating, by obtaining the deviation information by comparing only the target data other than the data that deteriorates the reliability of the deviation information, with the reference data. The processor 310 may control the display 330 to display information corresponding to the deviation information, on the target data. The information corresponding to the deviation information may include, for example, information expressing the deviation information with colors, contrasts, numerical values, and the like.

The data processing device 300 may generate a three-dimensional intraoral model based on raw data received from the three-dimensional scanners 100 and 110. Alternatively, the data processing device 300 may receive a three-dimensional intraoral model from the three-dimensional scanners 100 and 110. Alternatively, the data processing device 300 may receive a three-dimensional intraoral image from an external server or an external device through a wired or wireless communication network.

In an embodiment, the memory 320 may store data received from the three-dimensional scanners 100 and 110, for example, raw data obtained by scanning an oral cavity or an oral cavity model. In addition, the memory 320 may store a three-dimensional intraoral image generated by the data processing device 300, received from the three-dimensional scanners 100 and 110, or received from an external server or an external device.

The memory 320 according to an embodiment may store at least one instruction. The memory 320 may store at least one instruction or program to be executed by the processor 310.

In an embodiment, the memory 320 may store a plurality of three-dimensional intraoral images.

In an embodiment, the memory 320 may store dedicated software for data comparison. The dedicated software for data comparison may be referred to as a dedicated program, a dedicated tool, or a dedicated application.

In an embodiment, the memory 320 may include one or more instructions for identifying data that deteriorates the reliability of deviation information from among target data.

In an embodiment, the memory 320 may include one or more instructions for excluding data that deteriorates the reliability of deviation information in target data from calculation targets.

In an embodiment, the memory 320 may include one or more instructions for obtaining deviation information by comparing target data with reference data.

In an embodiment, the memory 320 may include one or more instructions for displaying deviation information as a color map on target data.

The processor 310 according to an embodiment may control the overall operation of the data processing device 300. The processor 310 may execute at least one instruction to control an intended operation to be performed. Here, the at least one instruction may be stored in the memory 320 included in the data processing device 300 separately from the processor 310 or in an internal memory (not shown) included in the processor 310.

In detail, the processor 310 may execute the at least one instruction to control at least one component included in the data processing device 300 such that an intended operation is performed. Therefore, although an example in which the processor 310 performs certain operations is described, it may mean that the processor 310 controls at least one component included in the data processing device 300 to perform the operations.

In an embodiment, the processor 310 may obtain target data and reference data. The processor 310 may obtain an intraoral image to be used as target data and an intraoral image to be used as reference data, from among a three-dimensional intraoral image generated based on raw data received from the three-dimensional scanners 100 and 110 or a three-dimensional intraoral image obtained from the memory 320, the three-dimensional scanners 100 and 110, an external server or an external device, or the like. In an embodiment, both the reference data and the target data may be three-dimensional scan data.

In an embodiment, the processor 310 may obtain deviation information. In an embodiment, the deviation information may be information indicating a degree of deviation of the target data from the reference data. That is, the deviation information is information indicating a difference between the target data and the reference data, and may be information indicating how far away the target data is from the reference data, as a numerical value.

In an embodiment, the processor 310 may obtain deviation information by comparing the target data from which data that deteriorates the reliability of the deviation information is excluded, with the reference data. Thus, the deviation information obtained by the processor 310 according to an embodiment may be information indicating a difference between the target data from which the data that deteriorates the reliability of the deviation information is excluded, and the reference data.

In an embodiment, the deviation information may include a distance difference between the target data and the reference data. For example, the deviation information may include a distance between a point on the target data and a point on the reference data.

In an embodiment, the processor 310 may obtain the deviation information between the target data and the reference data by using a normal vector or a shortest distance.

First, a method, performed by the processor 310, of obtaining deviation information between target data and reference data by using a normal vector will be described.

The processor 310 may project a normal vector perpendicular to a tangent plane with respect to a point on the target data, onto the reference data to identify a point at which the normal vector intersects one point on the reference data. When the point on the target data is referred to as a first point, and the point at which the normal vector projected from the first point intersects the reference data is referred to as a second point, the processor 310 may obtain a distance between the first point and the second point, as deviation information.

In an embodiment, when the deviation information is obtained by using the normal vector, the processor 310 may identify data of points included in a target data boundary region as data that deteriorates the reliability of the deviation information.

In an embodiment, when obtaining the deviation information, the processor 310 may exclude the points included in the target data boundary region, which are identified as the data that deteriorates the reliability of the deviation information.

In another embodiment, the processor 310 may use a shortest distance to obtain deviation information between the target data and the reference data.

In an embodiment, the processor 310 may obtain a distance to reference data that is closest to the target data and use the obtained shortest distance as deviation information. For example, when a point on the target data is referred to as a first point and a point on the reference data closest to the first point is referred to as a third point, the processor 310 may obtain a distance between the first point and the third point as deviation information.

In an embodiment, when the deviation information is obtained by using the shortest distance, and the third point closest to the first point on the target data is included in a reference data boundary region, the processor 310 may identify the first point on the target data as data that deteriorates the reliability of the deviation information.

In an embodiment, the processor 310 may obtain deviation information by excluding the data that deteriorates the reliability of the deviation information from the target data and comparing the remaining target data with the reference data.

In an embodiment, when obtaining the deviation information between the target data and the reference data, the processor 310 may receive the user's selection for a method to be used to obtain the deviation information, from among a method using a normal vector and a method using a shortest distance.

Alternatively, the processor 310 may automatically select a method for obtaining more reliable deviation information from the target data and the reference data, from among the method using a normal vector and the method using a shortest distance.

The display 330 according to an embodiment may output a three-dimensional intraoral image on a screen. In an embodiment, the display 330 may output target data and reference data on the screen. In an embodiment, the display 330 may output deviation information between the reference data and the target data from which data that deteriorates the reliability of the deviation information is excluded from calculation targets.

In an embodiment, the display 330 may display the deviation information on the target data by using information corresponding to the deviation information. In an embodiment, the display 330 may display colors as the information corresponding to the deviation information, on the target data. The display 330 may display the deviation information as a color map by displaying each vertex of the target data used to obtain the deviation information from the target data, in a color corresponding to the deviation information for the vertex.

In the embodiment, the data that deteriorates the reliability of the deviation information is not used when obtaining the deviation information, and thus does not have deviation information. Thus, vertices of the data that is not used to obtain the deviation information cannot be expressed with information corresponding to the deviation information, such as a color map.

In an embodiment, when a vertex of the data that deteriorates the reliability of the deviation information does not have deviation information, the display 330 may display the vertex having no deviation information in a predetermined color. Here, the predetermined color may be different from colors corresponding to the deviation information, that is, colors in the color map. For example, the display 330 may display the vertex having no deviation information in a gray color that is not included in the color map. Through this, the display 330 may display the color of the vertex of the data with low reliability to be distinguished from other regions represented by the color map.

In an embodiment, the display 330 may also display information corresponding to the deviation information as a numerical value. The display 330 may output statistical properties of distances between the reference data and the target data, which are obtained by comparing the reference data with the target data in which the data that deteriorates the reliability of the deviation information is excluded from the calculation targets.

As such, according to an embodiment, the data processing device 300 may obtain the deviation information between the target data and the reference data by using a normal vector or a shortest distance.

In addition, according to an embodiment, the data processing device 300 may identify the data that deteriorates the reliability of the deviation information in different manners when using the normal vector and when using the shortest distance, respectively, and exclude the identified data from the target data.

In addition, according to an embodiment, the data processing device 300 may obtain more accurate and highly reliable deviation information by comparing the target data in which the data that deteriorates the reliability of the deviation information is excluded from the calculation targets, with the reference data.

In addition, according to an embodiment, the data processing device 300 may display a color map including colors corresponding to the deviation information, on the target data.

Figure 4:
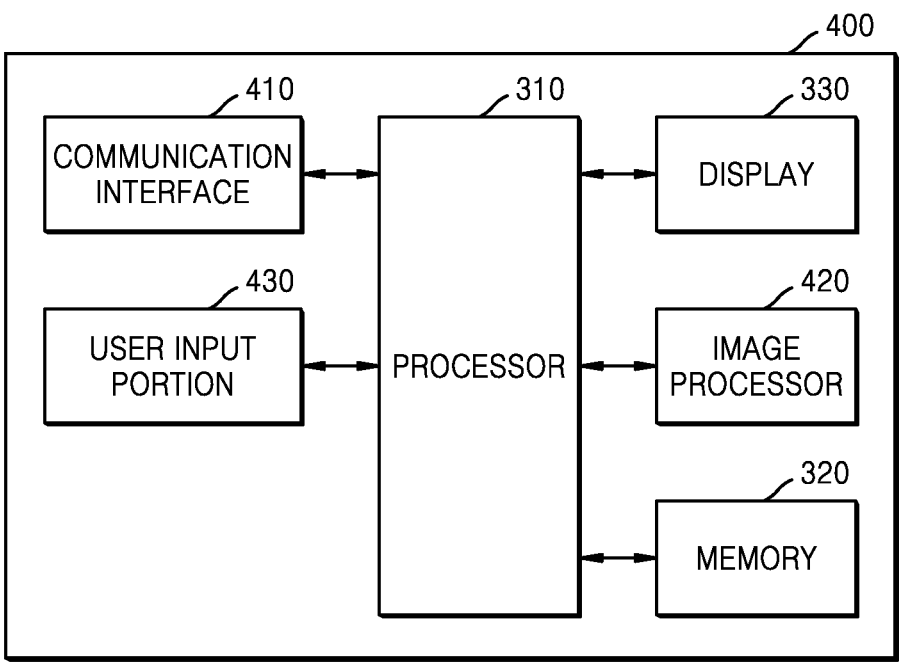
FIG. 4 is a diagram illustrating an example of the data processing device of FIG. 3.

FIG. 4 is a diagram illustrating an example of the data processing device of FIG. 3.

Referring to FIG. 4, a data processing device 400 may further include a communication interface 410, an image processor 420, and a user input portion 430, in addition to the processor 310, the memory 320, and the display 330.

The processor 310, the memory 320, and the display 330 included in the data processing device 400 of FIG. 4 performs the same functions as those of the processor 310, the memory 320, and the display 330 included in the data processing device 300 of FIG. 3, respectively, and thus are illustrated with the same reference numerals. Hereinafter, the descriptions of the data processing device 300 of FIG. 3 provided above will be omitted.

The user input portion 430 according to an embodiment may receive a user input for controlling the data processing device 400. The user input portion 430 may include, but is not limited to, a touch panel for detecting a touch of the user, a button for receiving a push manipulation by the user, and a user input device including a mouse or a keyboard for designating or selecting a point on a user interface screen. In addition, the user input portion 430 may include a speech recognition device for speech recognition. For example, the speech recognition device may be a microphone, and may receive a voice command or a voice request of the user. Accordingly, the processor 310 may control an operation corresponding to the voice command or voice request to be performed.

In an embodiment, the user input portion 430 may receive a selection of target data and reference data from a user such as a dentist.

In an embodiment, the user input portion 430 may receive, from the user, a selection to obtain deviation information between target data and reference data.

In an embodiment, the user input portion 430 may receive, from the user, a selection a method of obtaining deviation information. For example, the user may select, as the method of obtaining deviation information between target data and reference data, one of a method using a normal vector and a method using a shortest distance, by using the user input portion 430.

In an embodiment, the user input portion 430 may receive, from the user, a selection on whether to exclude data that deteriorates the reliability of deviation information when comparing the target data with the reference data.

The image processor 420 according to an embodiment may perform operations for generating and/or processing an image. The image processor 420 may generate three-dimensional scan data based on raw data received from the three-dimensional scanners 100 and 110.

In an embodiment, the image processor 420 may display, on the target data, a color map including colors corresponding to the deviation information, under control of the processor 310. The image processor 420 may embed the deviation information into the three-dimensional scan data by changing the color of a point or vertex of the three-dimensional scan data to a color corresponding to the deviation information.

The display 330 according to an embodiment may output three-dimensional scan data. The display 330 may output target data and reference data selected by the user through the user input portion 430 from among a plurality of pieces of three-dimensional scan data, on separate screens or together on one screen.

In an embodiment, the display 330 may output a user interface screen for receiving a selection on whether to exclude data that deteriorates the reliability of deviation information. In response to the user interface screen output by the display 330, the user may select to exclude data that deteriorates the reliability of deviation information when obtaining the deviation information, through the user input portion 430. In this case, the processor 310 may obtain the deviation information by excluding the data that deteriorates the reliability of the deviation information from the target data.

In an embodiment, the display 330 may output a user interface screen for receiving a selection for a method of obtaining deviation information. The user interface screen for receiving a selection for a method of obtaining deviation information may be a screen for receiving the user's selection for a method of obtaining deviation information between target data and reference data, from among a method using a normal vector and a method using a shortest distance. The processor 310 may exclude the data that deteriorates the reliability of the deviation information from the target data according to the method of obtaining deviation information, which is selected by the user through the user input portion 430.

The communication interface 410 according to an embodiment may perform communication with at least one external electronic device through a wired or wireless communication network.

For example, the communication interface 410 may perform communication with the three-dimensional scanners 100 and 110 under control of the processor 310. In an embodiment, the communication interface 410 may receive raw data from the three-dimensional scanners 100 and 110 or obtain three-dimensional scan data. In an embodiment, the communication interface 410 may obtain three-dimensional scan data by performing communication with an external electronic device, an external server, or the like other than the three-dimensional scanners 100 and 110.

The communication interface 410 may include at least one short-range communication module configured to perform communication according to a communication standard such as Bluetooth, Wi-Fi, Bluetooth Low Energy (BLE), near-field communication (NFC)/radio-frequency identification (RFID), Wi-Fi Direct, ultra-wideband (UWB), or Zigbee.

In addition, the communication interface 410 may further include a long-range communication module configured to communicate with a server for supporting long-range communication according to a long-range communication standard. In detail, the communication interface 410 may include a long-range communication module configured to perform communication through a network for Internet communication. For example, the communication interface 410 may include a communication module configured to perform communication through a communication network conforming to a mobile communication standard, such as $3^{rd}$ Generation (3G), $4^{th}$ Generation (4G), and/or $5^{th}$ Generation (5G).

In addition, the communication interface 410 may communicate with the three-dimensional scanners 100 and 110, an external server, an external electronic device, or the like in a wired manner. To this end, the communication interface 410 may include at least one port to be connected to the three-dimensional scanners 100 and 110 or an external electronic device through a cable. The communication interface 410 may perform communication with the three-dimensional scanners 100 and 110 or an external electronic device connected thereto through the at least one port.

In an embodiment, the communication interface 410 may transmit the deviation information between the target data and the reference data, to an external electronic device or an external server. For example, the communication interface 410 may transmit data in which the deviation information is indicated as a color map on the target data, to the external electronic device or the external server.

Figure 5:
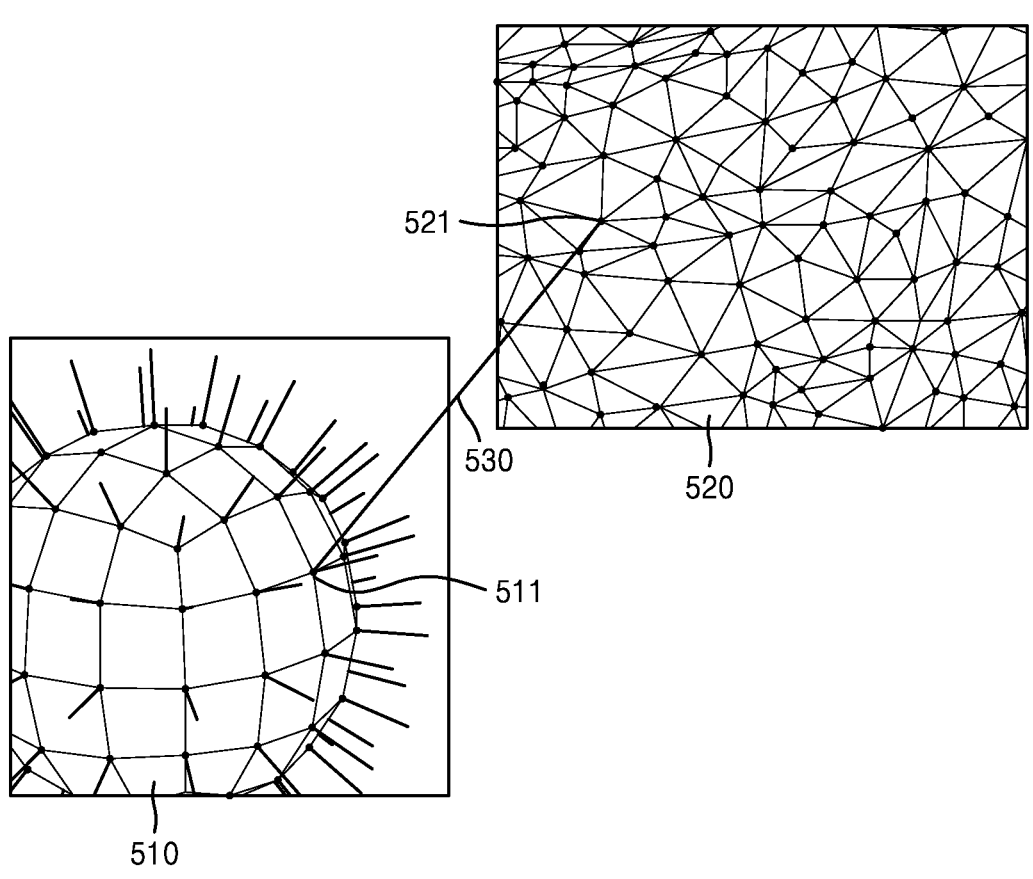
FIG. 5 is a diagram for describing a method of obtaining deviation information by using a normal vector, according to an embodiment.

FIG. 5 is a diagram for describing a method of obtaining deviation information by using a normal vector, according to an embodiment.

In an embodiment, the data processing device may use a normal vector to obtain deviation information between target data and reference data. The normal vector may refer to a vector having a direction perpendicular to a tangent plane including tangents to a point on a two-dimensional curved surface in a three-dimensional space.

The data processing device may project a normal vector perpendicular to a tangent plane with respect to a point on target data 510, onto the reference data to identify a point at which the normal vector intersects one point on the reference data.

FIG. 5 illustrates that a normal vector 530 is projected from a first point 511 of the target data 510 to a second point of reference data 520. As illustrated in FIG. 5, the data processing device may identify a second point 521 at which the normal vector 530 projected from the first point 511 on the target data 510 intersects the reference data 520, and obtain a distance between the first point 511 and the second point 521. The data processing device may obtain the distance between the first point 511 and the second point 521 as deviation information between the two points.

In an embodiment, the data processing device may identify whether a point that intersects the normal vector 530 projected from the first point 511 on the target data 510 is present in the reference data 520.

When the reference data 520 does not have a point that intersects the normal vector projected from the target data 510, the data processing device cannot obtain a distance between the first point 511 of the target data 510 and the reference data 520. For example, when the target data 510 and the reference data 520 are aligned with each other, and the area of the reference data 520 is less than the area of the target data 510, the reference data 520 may not include a point that intersects the normal vector projected from the target data 510. Alternatively, for example, a region that is not aligned with the reference data 520 may be present in the target data 510. In this case, the reference data 520 may not include a point that intersects the normal vector projected from the target data 510.

When the reference data 520 does not include a point that intersects the normal vector projected from the target data 510, the data processing device cannot obtain a distance between the first point 511 of the target data 510 and the reference data 520. That a distance with respect to the first point 511 of the target data 510 cannot be obtained may mean that deviation information with respect to the first point 511 of the target data 510 cannot be obtained. Accordingly, the data processing device does not need to identify whether the point at which deviation information cannot be obtained is low-reliability data.

When a point that intersects the normal vector projected from the target data 510 is present in the reference data 520, and for example, the area of the target data 510 is greater than or equal to the area of the reference data 520, the data processing device may identify whether the first point 511 is low-reliability data.

In an embodiment, the data processing device may identify data of points included in a target data boundary region as data that deteriorates the reliability of the deviation information.

In an embodiment, in order to determine whether the first point 511 is low-reliability data, the data processing device may identify whether the first point 511 is included in the target data boundary region.

In an embodiment, the target data boundary region may refer to a region distinguished by a boundary line between the target data and a region other than the target data. That is, the target data boundary region may refer to a region including a boundary line of the target data or an end point of the target data.

When the target data 510 is a closed surface without a boundary, such as a sphere, all points on the surface of the target data 510 may have an accurate tangent plane, and a normal vector perpendicular to each tangent plane may also have an accurate value. In this case, deviation information obtained by using a distance between an arbitrary point on the target data 510 and a point at which a normal vector projected from the arbitrary point intersects the reference data 520 has high reliability.

However, when the target data 510 is not a closed surface and thus has a boundary, points included in a boundary region of the target data 510 do not have an accurate normal vector. This is because, when the target data 510 is not a closed surface, a normal vector having an accurate direction cannot be identified at a point included in the boundary region of the target data 510. Thus, the reliability of a distance between a point included in the boundary region of the target data 510 and a point on the reference data 520 that intersects an inaccurate normal vector projected from the point included in the boundary region also decreases.

In an embodiment, when the first point 511 on the target data 510 is included in a target data boundary region, the data processing device may identify the first point 511 as data that deteriorates the reliability of the deviation information. When the first point 511 is low-reliability data, the data processing device may exclude data of the first point 511 from calculation targets of the deviation information. The data processing device may obtain the deviation information by using the target data 510 in which the data that deteriorates the reliability of the deviation information is excluded from the calculation targets, and the reference data.

Figure 6:
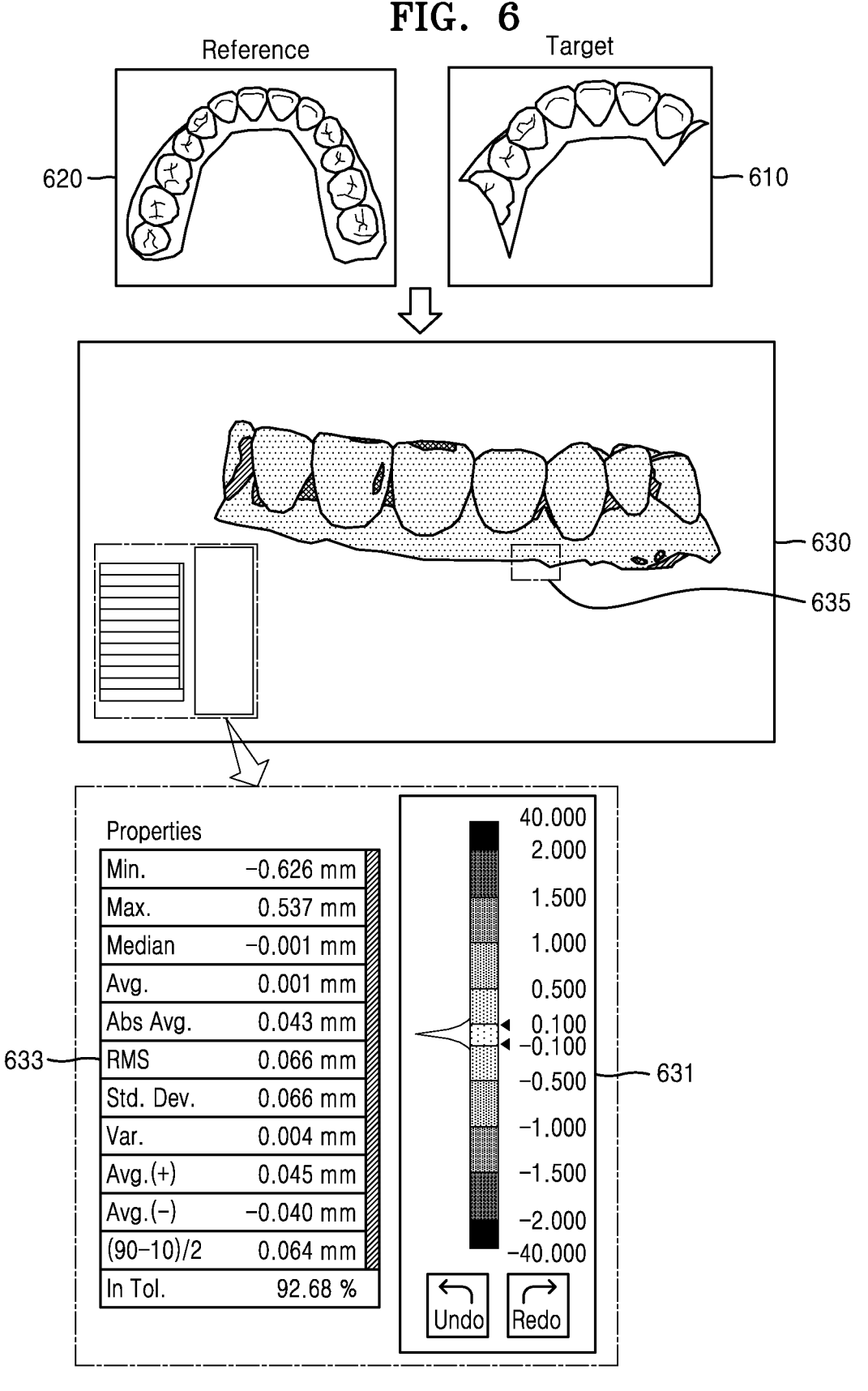
FIG. 6 is a diagram for describing a method of excluding data that deteriorates the reliability of deviation information from calculation targets when obtaining the deviation information by using a normal vector, according to an embodiment.

FIG. 6 is a diagram for describing a method of excluding data that deteriorates the reliability of deviation information from calculation targets when obtaining the deviation information by using a normal vector, according to an embodiment.

Figure 7:
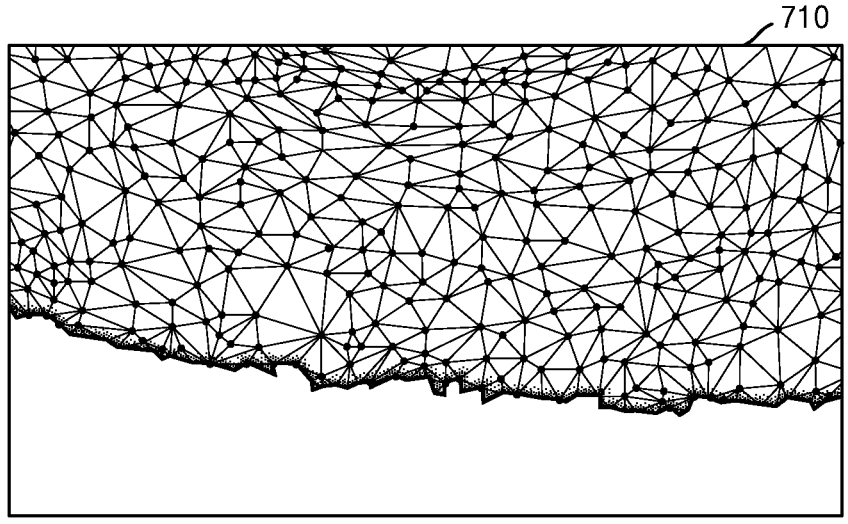
FIG. 7 is an enlarged view of result data obtained according to the method of FIG. 6.
Figure 7:
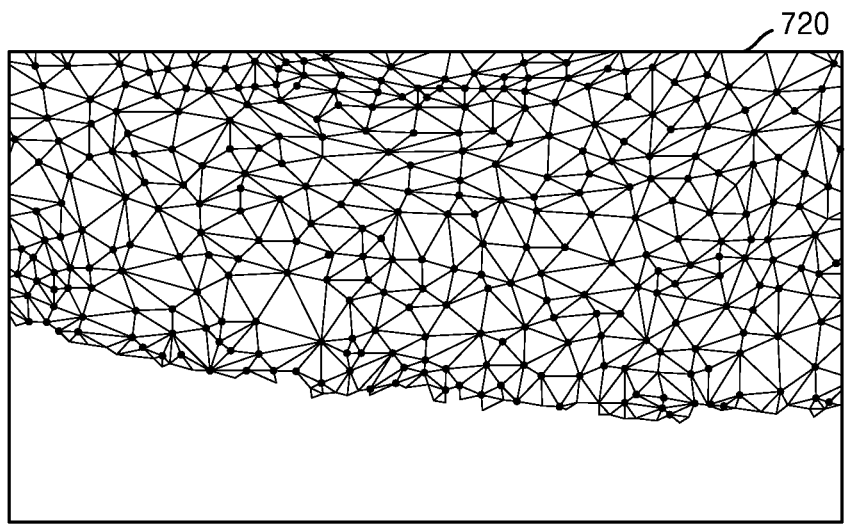
Figure 8:
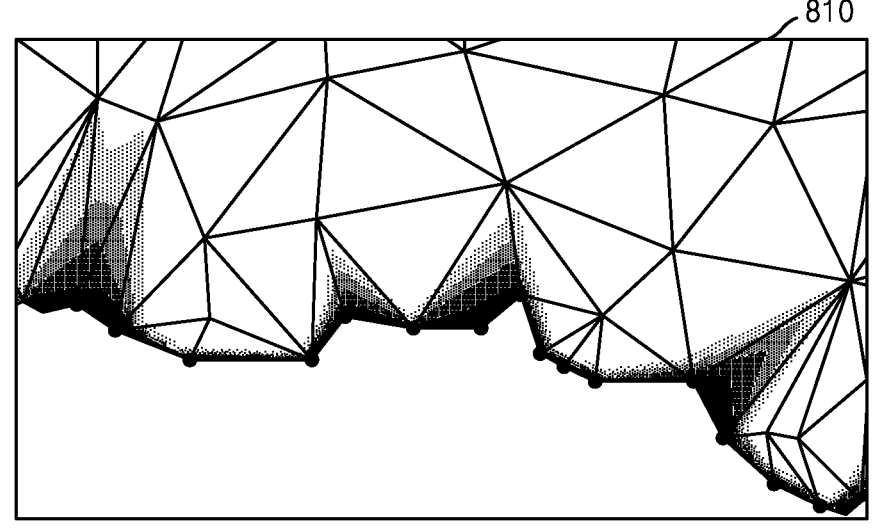
FIG. 8 is a further enlarged view of the result data of FIG. 7.
Figure 8:
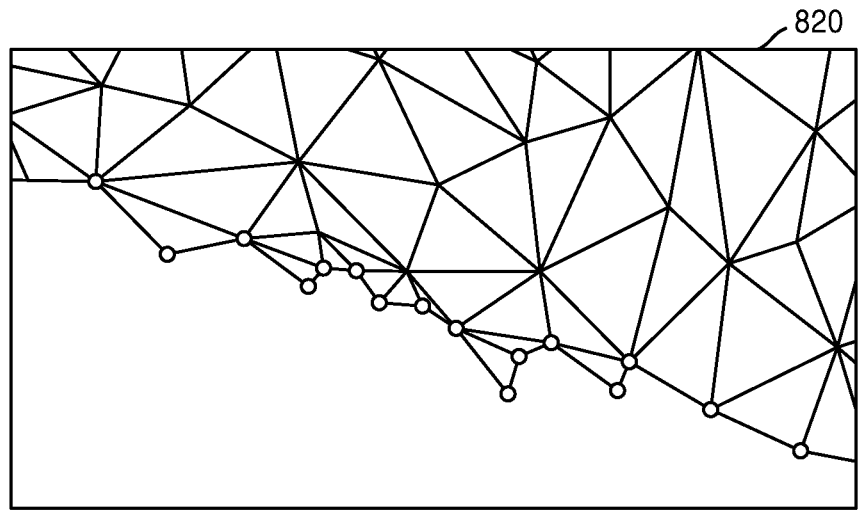

FIGS. 7 and 8 are enlarged views of result data obtained according to the method of FIG. 6.

Hereinafter, descriptions will be provided with reference to FIGS. 6 to 8.

The user may select an image to be used as reference data and an image to be used as target data, from among a plurality of three-dimensional intraoral images, by using a user input portion. The data processing device may output, through a display, target data 610 and reference data 620 both selected through the user input portion.

In FIG. 6, the data processing device may obtain a degree of deviation of the target data 610 from the reference data 620 by using a normal vector. The data processing device may obtain deviation information between the target data and the reference data by using a normal vector, automatically or according to the user's selection.

The data processing device may project a normal vector from one point of the target data 610 to obtain, as deviation information, a distance to a point on the reference data 620 that intersects the normal vector.

In an embodiment, the data processing device may first identify whether a point that intersects the normal vector is present in the reference data 620. As illustrated in FIG. 6, when the target data 610 and the reference data 620 are aligned with each other, and the area of the target data 610 is less than the area of the reference data 620, a point that intersects the normal vector projected from the target data 610 is present in the reference data 620.

In an embodiment, when a point that intersects the normal vector is present in the reference data 620, the data processing device may identify whether the point on the target data 610 is data that deteriorates the reliability of the deviation information.

In an embodiment, in order to identify whether the point on the target data 610 is data that deteriorates the reliability of the deviation information, the data processing device may identify whether the point on the target data 610 is included in the target data boundary region.

As described above, when the target data 610 does not form a closed surface, because a normal vector having an accurate direction cannot be obtained at a point included in the boundary region of the target data 610, a distance obtained by using an inaccurate normal vector may also not be an accurate value. That is, a distance between the point included in the boundary region of the target data 610 and the point at which the normal vector at the point included in the boundary region intersects the reference data 620 may have low reliability.

Three-dimensional scan data may be expressed as point cloud data or may include meshes generated by a technique such as triangulation based on point cloud data. The mesh may include minimum unit polygons that are referred to as polygons. The polygon may be, for example, a triangle. Each angular point of triangles constituting the mesh may be referred to as a vertex.

In an embodiment, in order to identify whether a point on the target data 610 is included in the target data boundary region, the data processing device may identify whether there is another polygon that shares a corner with the polygon included in the three-dimensional scan data. When there is no other polygon sharing the corner with the polygon included in the three-dimensional scan data, the data processing device may identify the corner as the target data boundary region.

In an embodiment, when the point on the target data 610 is included in the target data boundary region, the data processing device may determine that the point on the target data 610 is data that deteriorates the reliability of the deviation information, and exclude the data that deteriorates the reliability of the deviation information in obtaining the deviation information. The data processing device may obtain the deviation information by comparing the target data in which the data that deteriorates the reliability of the deviation information is excluded from the calculation targets, with the reference data 620.

In an embodiment, the data processing device may obtain result data 630 in which the deviation information is embedded as a color map on the target data 610, and output the result data 630. The data processing device may embed a color corresponding to a distance between each point of the target data in which the data that deteriorates the reliability of the deviation information is excluded from the calculation targets, and a mapping point of the reference data 620, in the point of the target data. The colors of the color map may be expressed in different colors according to the distance between the two points of the reference data 620 and the target data in which the data that deteriorates the reliability of the deviation information is excluded from the calculation targets.

In an embodiment, the result data 630 may further include color indication information 631. The color indication information 631 may be information indicating which color corresponds to each section when the deviation information is divided into a plurality of sections according to the distance. The user such as a dentist may use the color map and the color indication information 631 of the result data 630 to determine a degree of deviation between the target data 610 and the reference data 620 for each point.

In an embodiment, the result data 630 may further include deviation information 633 expressed in numerical values. The deviation information 633 expressed in numerical values may be information indicating properties of distances between the reference data 620 and the target data in which the data that deteriorates the reliability of the deviation information is excluded from the calculation targets.

In more detail, the deviation information 633 expressed in numerical values may include statistical properties of the distribution of distances between a plurality of points included in the target data in which the data that deteriorates the reliability of the deviation information is excluded from the calculation targets, and points on the reference data 620 mapped to the plurality of points, respectively. The data processing device may obtain the distances between the plurality of points included in the target data in which the data that deteriorates the reliability of the deviation information is excluded from the calculation targets, and the points of the reference data mapped to the plurality of points, respectively. The data processing device may obtain the statistical properties of the distance distribution by using the distances for the plurality of points. The statistical properties of the distance distribution may include at least one of a minimum, a maximum, a median, an average, an absolute average, a mode, a range, and a variance of the distances between the target data and the reference data. The deviation information 633 expressed in numerical values also indicates the properties of the distances between the reference data 620 and the target data in which the data that deteriorates the reliability of the deviation information is excluded from the calculation targets, and thus may provide the user with more accurate information.

FIG. 7 is an enlarged view of result data obtained according to the method of FIG. 6.

In FIG. 7, 710 is an enlarged view of a part of a boundary region 635 of the result data 630 obtained according to the method illustrated in FIG. 6, and 720 is an enlarged view of a part of a boundary region of result data when deviation information is obtained without excluding data that deteriorates the reliability of the deviation information from calculation targets in the method illustrated in FIG. 6.

As illustrated in FIG. 7, when the data that deteriorates the reliability of the deviation information is excluded from the calculation targets in the target data 610, that is, when the data processing device obtains the deviation information except for points included in the boundary region of the target data 610, a point included in the boundary region 635 of the target data 610 is displayed in a different color from the color of a point used to obtain the deviation information.

On the contrary, when the data that deteriorates the reliability of the deviation information is not excluded from the calculation targets, that is, when the data processing device obtains the deviation information by using all points included in the boundary region of the target data 610, points included in the boundary region and a region outside the boundary region are displayed in the same color.

FIG. 8 is a further enlarged view of the result data of FIG. 7.

In FIG. 8, 810 and 820 are further enlarged views of 710 and 720 of FIG. 7, respectively.

Three-dimensional scan data may include numerous meshes. The mesh includes polygons such as triangles, and the triangles constituting the mesh may have three vertices as angular points. Each vertex has its own color, and a triangle between two connected vertices having different colors may be expressed in a color obtained by linearly interpolating the two different colors and/or a gradient color of the two different colors. A method of expressing two connected vertices having different colors is not limited thereto. In addition, the surface of a triangle formed by three vertices having the same color may be expressed in the same color as the three vertices.

In an embodiment, when the data processing device obtains deviation information without using data that deteriorates the reliability of the deviation information in calculation, a mesh or a vertex identified as data that deteriorates the reliability of the deviation information may be displayed in a different color from the color of a mesh or a vertex used to obtain the deviation information.

In an embodiment, when there are no other polygons sharing a corner of a polygon in the target data, the data processing device may identify the corner as a boundary region. For example, when there are no other triangles sharing a line segment forming a boundary of each face of a triangle in the target data, the data processing device may identify the face as a target data boundary region. The data processing device may identify data of a vertex included in the face identified as the target data boundary region, as data that deteriorates the reliability of the deviation information.

In an embodiment, the data processing device may obtain the deviation information by excluding vertices included in the boundary region, which are data that deteriorates the reliability of, from the calculation targets. In this case, distances to the reference data are not obtained for the vertices included in the target data boundary region that are not used when obtaining the deviation information, and thus do not have colors corresponding to the distances. Thus, the vertices, which are data included in the boundary region and are not used when obtaining the deviation information, cannot be expressed as a color map.

In an embodiment, the data processing device may display vertices having no values in a color different from the colors of the color map. For example, the data processing device may display the vertices having no values in a predetermined color, for example, gray. As such, when the data processing device displays the vertices of the data included in the boundary region in a color different from the colors expressed in the color map, the user may identify that the vertices are data that are not used when obtaining the deviation information.

820 of FIG. 8 illustrates result data of obtaining the deviation information in a state in which the data that deteriorates the reliability of the deviation information, that is, the data of the points included in the boundary region, is not excluded from the calculation targets in the target data 610. Referring to 820, it may be seen that vertices located in the boundary region and vertices not located in the boundary region have the same color. Thus, triangles with the same vertices also have the same color.

However, 810 illustrates the result data of obtaining the deviation information in a state in which the data of the points included in the boundary region with low reliability in the target data 610 is excluded from the calculation targets, and thus, the vertices located in the boundary region that are not used when obtaining the deviation information have different colors from the colors of the vertices not located in the boundary region. In addition, a triangle including both a vertex having a changed color and located in the boundary region and a vertex having an original color and not located in the boundary region is expressed in a color obtained by linearly interpolating the changed color and the original color and/or a gradient color of the changed color and the original color.

Figure 9:
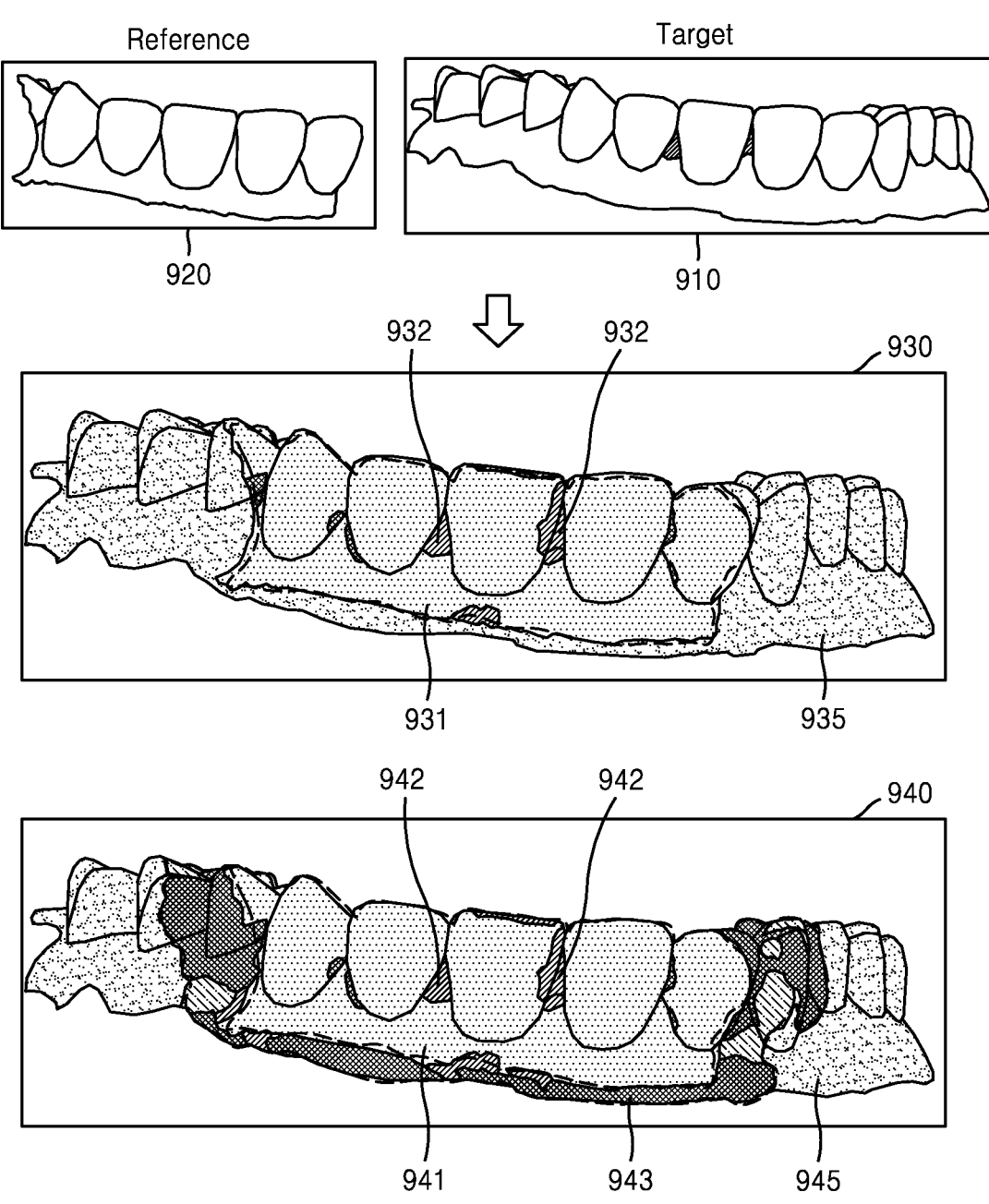
FIG. 9 is a diagram for describing a method of excluding data that deteriorates the reliability of deviation information from calculation targets when obtaining the deviation information by using a shortest distance, according to an embodiment.

FIG. 9 is a diagram for describing a method of excluding data that deteriorates the reliability of deviation information from calculation targets when obtaining the deviation information by using a shortest distance, according to an embodiment.

The data processing device may obtain deviation information between the target data and the reference data by using a shortest distance, automatically or according to the user's selection.

The data processing device may receive, from the user, a selection of an image to be used as reference data and an image to be used as target data, from among a plurality of three-dimensional intraoral images.

The data processing device may output target data 910 and reference data 920 through the display.

In an embodiment, the data processing device may obtain, as deviation information, a distance between a point on the target data 910 and a point on the reference data 920 that is the closest to the point on the target data 910. For example, when a point on the target data 910 is referred to as a first point and a point on the reference data 920 closest to the first point is referred to as a third point, the data processing device may obtain a distance between the first point and the third point as deviation information.

Because the method of obtaining deviation information by using a shortest distance does not consider the direction of a normal vector, unlike the method of obtaining deviation information by using a normal vector, a point closest to the first point on the target data 910, for example, the third point, is necessarily present in the reference data 920.

In an embodiment, before obtaining the deviation information, the data processing device may first identify data that deteriorates the reliability of the deviation information in the target data 910.

In an embodiment, in order to identify whether the first point on the target data 910 is data that deteriorates the reliability of the deviation information, the data processing device may identify whether the third point on the reference data 920, which is the closest to the first point, is included in a reference data boundary region.

Among points included in the target data 910, there may be points mapped to the same points on the reference data 920. For example, when the area of the target data 910 is greater than the area of the reference data 920, a point on the reference data 920 located at the shortest distance from points of the target data 910 that is greater than the boundary of the reference data 920 is located in a boundary region of the reference data 920. That is, because a plurality of points included in the target data 910 are mapped to points of the boundary region of the reference data 920, deviation information obtained from the plurality of points included in the target data 910 mapped to the points in the boundary region of the reference data 920 has low reliability.

In an embodiment, the data processing device may identify that data of the points included in the target data 910 mapped to the boundary region of the reference data 920 has low reliability. The data processing device may identifying whether there is other polygons sharing a corner with a polygon included in the reference data 920 that is three-dimensional scan data, so as to identify whether the corner of the reference data 920 is a boundary region.

In an embodiment, the data processing device may determine that the points included in the target data 910 mapped to the boundary region of the reference data 920 are data that deteriorates the reliability of the deviation information, and exclude the data that deteriorates the reliability of the deviation information in obtaining the deviation information. The data processing device may obtain the deviation information by comparing the target data in which the data that deteriorates the reliability of the deviation information is excluded from calculation targets, with the reference data 920.

In an embodiment, the data processing device may obtain result data by embedding the deviation information as a color map on the target data 910.

In FIGS. 9, 930 and 940 are diagrams illustrating result data obtained by the data processing device from the target data 910 and the reference data 920, as color maps.

930 illustrates result data obtained by the data processing device excluding the data that deteriorates the reliability of the deviation information from the calculation targets, and then embedding, in each point of the target data, a color corresponding to a distance between the point of the target data and a point on the reference data 920, which is at the shortest distance from the point of the target data, according to an embodiment. In contrast, 940 illustrates result data obtained by the data processing device embedding, in each point of the target data, a color corresponding to a distance between the point of the target data and a point on the reference data 920, which is at the shortest distance from the point of the target data, without excluding the data that deteriorates the reliability of the deviation information from the calculation targets, according to an embodiment.

In 930 and 940, 931 and 941 are regions in which the shortest distance between the target data 910 and the reference data 920 is within a preset range. For example, 931 and 941 may be regions in which the shortest distance between the target data 910 and the reference data 920 is between −0.1 mm and +0.1 mm. Regions indicated by 932 and 942 included in regions indicated by 931 and 941 may be regions in which the shortest distance between the target data 910 and the reference data 920 is between −0.5 mm and +0.5 mm. The regions indicated by 931, 932, 941, and 942 may be regions of interest to the user such as a dentist. The user may check a degree of deviation between the target data 910 and the reference data 920 by using the regions indicated by 931, 932, 941, and 942.

However, this is an example and 931 and 941 may include regions in which the shortest distance between the target data 910 and the reference data 920 is not within the preset range. For example, in the above example, when the regions indicated by 932 and 942 included in the regions indicated by 931 and 941 are regions in which the shortest distance between the two pieces of data is not identified because the target data 910 and the reference data 920 are far from each other, the regions indicated by 932 and 942 may be expressed in the same color or texture as that of the regions indicated by 935 and 945, unlike in FIG. 9.

In 930 and 940, 935 and 945 may be regions excluded from calculation targets, in which the shortest distance between the target data 910 and the reference data 920 is not identified.

In 940, 943 is a region that is larger than a boundary of the reference data 920 by up to a preset range and represents points of the target data 910 that are located around the boundary of the reference data 920. The region indicated by 943 may refer to a region including points at which the shortest distance between the target data 910 and the reference data 920 is identified but has low reliability.

As described above, when the area of the target data 910 is greater than the area of the reference data 920, points of the target data 910 located around the boundary of the reference data 920 and larger than the reference data 920 are mapped to points of the boundary area of the reference data 920, and thus, deviation information obtained from a plurality of points included in the target data 910 and mapped to points in the boundary region of the reference data 920 has low reliability. As illustrated in 940, when the data that deteriorates the reliability of the deviation information, that is, the region represented by 943, is expressed as a particular color map, the users may be distracted by unnecessary data that is unreliable and unimportant.

Unlike 940, 930 does not separately include the region indicated by 943 because the region indicated by 943 is included in 935 and displayed. This is because the data processing device obtains the deviation information from regions other than the region including points having data that deteriorates the reliability of the deviation information, and thus, the region including the points having the data that deteriorates the reliability of the deviation information is included in the region for which the shortest distance is not identified. Accordingly, the user may focus only on highly reliable and important information, that is, the regions indicated by 931, 932, 941, and 942, without consuming energy on unnecessary information.

Figure 10:
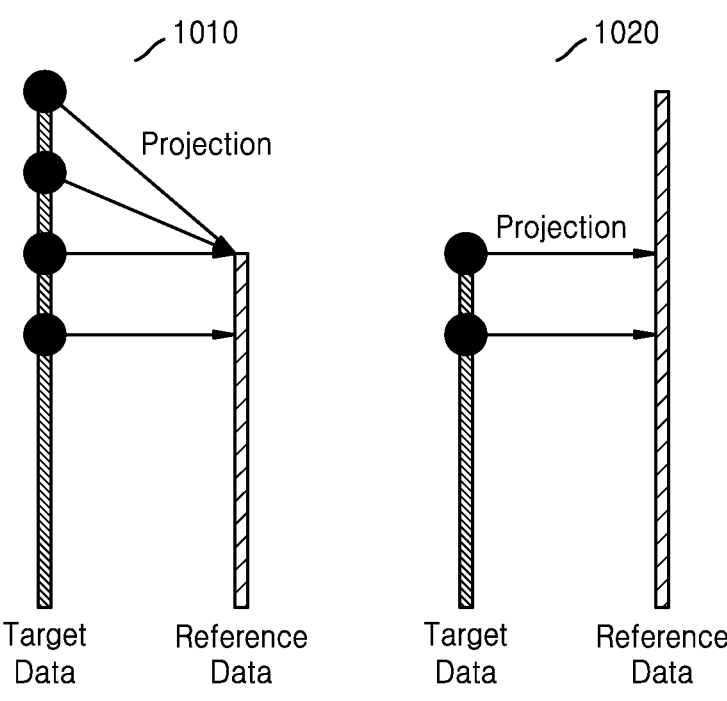
FIG. 10 is a diagram for describing a method of identifying data that deteriorates the reliability of deviation information when obtaining the deviation information by using a shortest distance, according to an embodiment.

FIG. 10 is a diagram for describing a method of identifying data that deteriorates the reliability of deviation information when obtaining the deviation information by using a shortest distance, according to an embodiment.

In FIGS. 10, 1010 and 1020 are diagrams in which each of target data and reference data is simplified and displayed as a straight line.

1010 illustrates a case in which the area of the target data is greater than the area of the reference data. Referring to 1010, it may be seen that, when the area of the target data is greater than the area of the reference data, all points of the target data that are larger than a boundary region of the reference data are projected onto the boundary region of the reference data. Thus, distances obtained from the points of the target data that are mapped to boundary points of the reference data are due to the size difference between the reference data and the target data, and thus cannot be regarded as representing a deviation from the reference data that the user wants to check.

In an embodiment, when the area of the target data is greater than the area of the reference data as illustrated in 1010, the data processing device may identify the points of the target data projected onto the boundary region of the reference data as data points that deteriorate the reliability of the deviation information, and obtain the deviation information by using only the remaining target data other than the that deteriorate the reliability of the deviation information.

1020 illustrates a case in which the area of the reference data is greater than the area of the target data. Referring to 1020, it may be seen that, when the area of the reference data is greater than the area of the target data, points of the target data are projected onto particular points of the reference data, respectively. That is, when the area of the reference data is greater than the area of the target data, because the shortest distance between the target data and the reference data is not due to a data size difference, the data processing device may obtain distances for all points of the target data and obtain the deviation information based on the distances.

Figure 11:
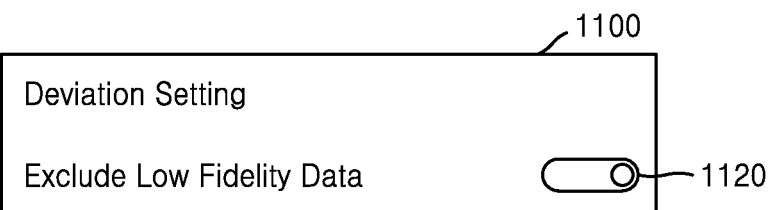
FIG. 11 illustrates a diagram of outputting, by a data processing device, a user interface screen for receiving a selection on whether to exclude data that deteriorates the reliability of deviation information, according to an embodiment.

FIG. 11 illustrates a diagram of outputting, by a data processing device, a user interface screen for receiving a selection on whether to exclude data that deteriorates the reliability of deviation information, according to an embodiment.

In an embodiment, the data processing device may receive, from a user, a selection of various pieces of setting information in relation to obtaining of deviation information.

In an embodiment, the data processing device may display a user interface screen 1100 for receiving a selection on whether to exclude data that deteriorates the reliability of deviation information in relation to obtaining of the deviation information, in the form of a text window on a partial region of the display. The size, output position, transparency, and/or shape of the user interface screen 1100 for selecting whether to exclude data that deteriorates the reliability of the deviation information may be modified in various ways.

The user may view the user interface screen 1100 and select whether to exclude data that deteriorates the reliability of the deviation information ('Exclude Low Fidelity Data'), by using a selection button 1120.

When a user input for selecting to exclude data that deteriorates the reliability of the deviation information is received through the user interface screen 1100, the data processing device may obtain the deviation information after excluding data that deteriorates the reliability of the deviation information.

When a user input for selecting not to exclude data that deteriorates the reliability of the deviation information is received through the user interface screen 1100, the data processing device may obtain the deviation information without excluding data that deteriorates the reliability of the deviation information.

Figure 12:
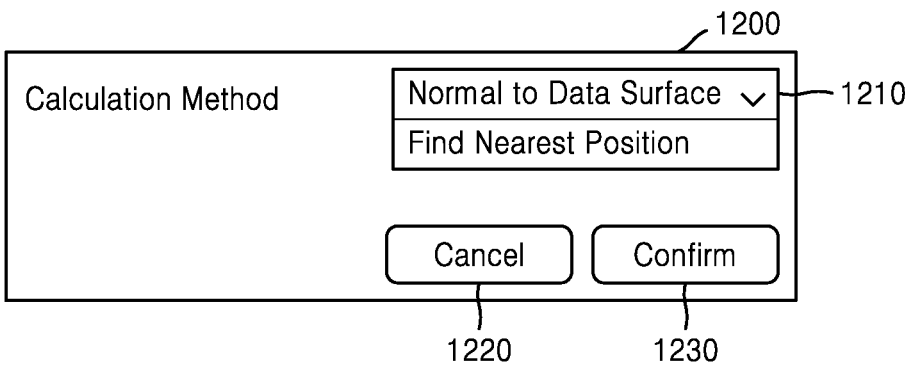
FIG. 12 illustrates a diagram of outputting, by a data processing device, a user interface screen for receiving a selection for a method of obtaining deviation information, according to an embodiment.

FIG. 12 illustrates a diagram of outputting, by a data processing device, a user interface screen for receiving a selection for a method of obtaining deviation information, according to an embodiment.

In an embodiment, the data processing device may receive, from a user, a selection of various pieces of setting information in relation to obtaining of deviation information.

In an embodiment, the data processing device may display a user interface screen 1200 for receiving a selection for a method of obtaining deviation information, in the form of a text window on a partial region of the display. The size, output position, transparency, and/or shape of the user interface screen 1200 for receiving a selection for a method of obtaining deviation information may be variously modified.

The user may select a method using a normal vector ('Normal to Data Surface') or a method using a shortest distance ('Find Nearest Position'), by using a method selection button 1210 included in the user interface screen 1200 for receiving a selection for a method of obtaining deviation information.

When a user input for selecting a 'Cancel' menu 1220 is received, the data processing device may terminate the output of the user interface screen 1200 for receiving a selection for a method of obtaining deviation information.

When a user input for selecting a 'Confirm' menu 1230 is received, the data processing device may obtain deviation information according to a method selected by using the method selection button 1210.

For example, when the user selects to exclude data that deteriorates the reliability of the deviation information, through the user interface screen 1100 for selecting whether to exclude data that deteriorates the reliability of the deviation information of FIG. 11, and select the method using a normal vector as the method of obtaining deviation information, through the user interface screen 1200 for receiving a selection for a method of obtaining deviation information of FIG. 12, the data processing device may identify data included in a boundary region of the target data as data that deteriorates the reliability of the deviation information, exclude the identified data, and then obtain, as the deviation information, a distance between the target data and the reference data by using a normal vector.

For example, when the user selects to exclude data that deteriorates the reliability of the deviation information, through the user interface screen 1100 for selecting whether to exclude data that deteriorates the reliability of the deviation information of FIG. 11, and select the method using a shortest distance as the method of obtaining deviation information, through the user interface screen 1200 for receiving a selection for a method of obtaining deviation information of FIG. 12, the data processing device may identify data of points of the target data that are mapped to a boundary region of the reference data as data that deteriorates the reliability of the deviation information, exclude the identified data, and then obtain the deviation information by using a shortest distance between the target data and the reference data.

Figure 13:
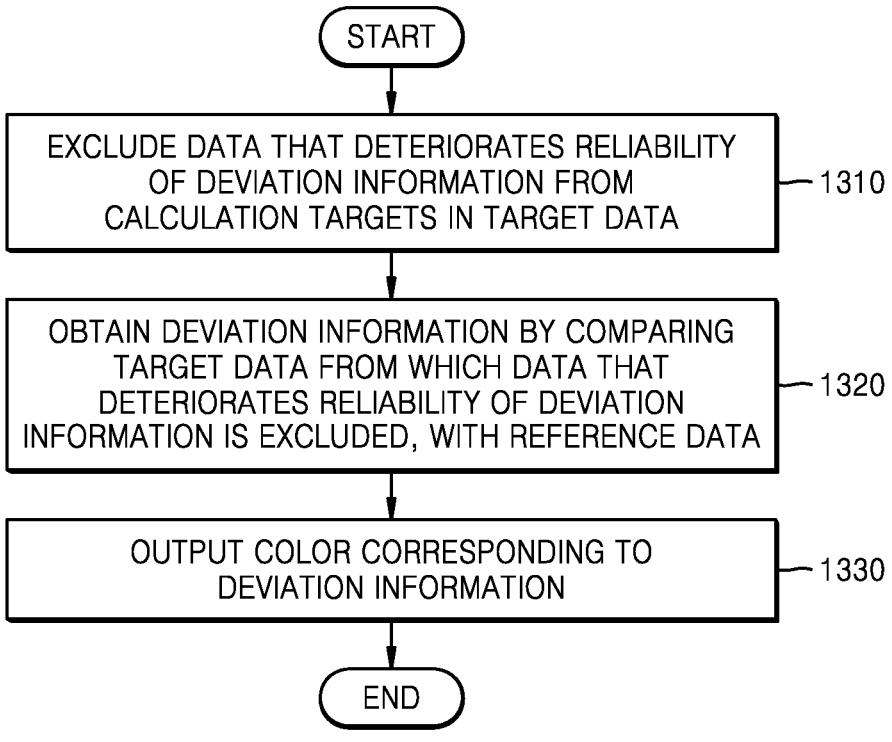
FIG. 13 is a flowchart illustrating a method of obtaining deviation information, according to an embodiment.

FIG. 13 is a flowchart illustrating a method of obtaining deviation information, according to an embodiment.

Referring to FIG. 13, the data processing device may exclude data that deteriorates the reliability of deviation information from calculation targets in target data (operation 1310). To this end, the data processing device may identify the data that deteriorates the reliability of the deviation information in the target data. The data processing device may determine which data to identify as data that deteriorates the reliability of the deviation information, according to the method of obtaining deviation information.

The data processing device may obtain the deviation information by comparing the target data from which the data that deteriorates the reliability of the deviation information is excluded, with reference data (operation 1320).

The data processing device may obtain the deviation information between the target data and the reference data according to the method of obtaining deviation information.

The deviation information between the target data and the reference data may be the same as or different from each other in a case in which the data processing device uses a normal vector and in a case in which the data processing device uses a shortest distance. For example, when the direction of a normal vector projected from a first point of the target data is toward a point of the reference data that is the closest to the first point, a second point of the reference data that intersects the normal vector projected from the first point of the target data may be the same as a third point of the reference data that is at the shortest distance from the first point of the target data. In this case, the deviation information obtained by using the normal vector and the deviation information obtained by using the shortest distance are identical to each other. However, when the direction of the normal vector projected from a first point of the target data is not toward a point of the reference data that is the closest to the first point, a second point of the reference data that intersects the normal vector projected from the first point of the target data is not identical to a third point of the reference data that is at the shortest distance from the first point of the target data, and the deviation information obtained by using the normal vector and the deviation information obtained by using the shortest distance have different values.

The data processing device may output a color corresponding to the deviation information (operation 1330). The data processing device may output a color corresponding to the deviation information to a region of the target data other than a point of the data that deteriorates the reliability of the deviation information. In addition, the data processing device may display the point of the data that deteriorates the reliability of the deviation information in a predetermined color different from colors of a color map. That is, the data processing device may indicate that the data that deteriorates the reliability of the deviation information is not used to obtain the deviation information, by displaying at least one of a point, a vertex, and a polygon including vertices, which are included in points of low-reliability target data, in a predetermined color.

Figure 14:
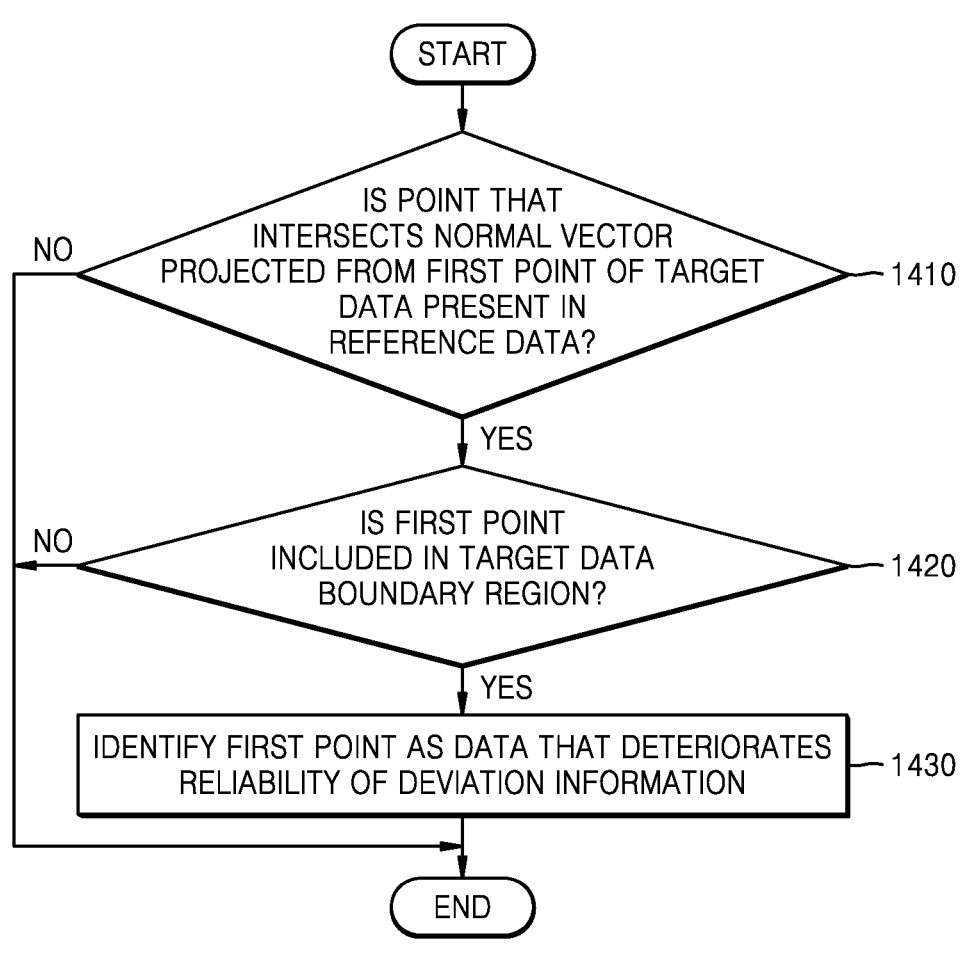
FIG. 14 is a flowchart illustrating a method of obtaining deviation information by using a normal vector, according to an embodiment.

FIG. 14 is a flowchart illustrating a method of obtaining deviation information by using a normal vector, according to an embodiment.

Referring to FIG. 14, the data processing device may identify whether a point that intersects a normal vector projected from a first point of target data is present in reference data (operation 1410). When a point that intersects the normal vector projected from the first point of the target data is not present in the reference data, the data processing device may not obtain deviation information for the first point of the target data.

When a point that intersects the normal vector projected from the first point of the target data is present in the reference data, the data processing device may identify whether the first point is included in a target data boundary region (operation 1420).

When the first point is not included in the target data boundary region, the data processing device may not identify the first point of the target data as data that deteriorates the reliability of the deviation information, and may obtain, as the deviation information, a distance between the first point and the reference data.

When the first point is included in the target data boundary region, the data processing device may identify the first point as data that deteriorates the reliability of the deviation information (operation 1430). When the first point is identified as data that deteriorates the reliability of the deviation information, the data processing device does not use the first point to obtain the deviation information such that the data that deteriorates the reliability of the deviation information does not affect the deviation information.

Figure 15:
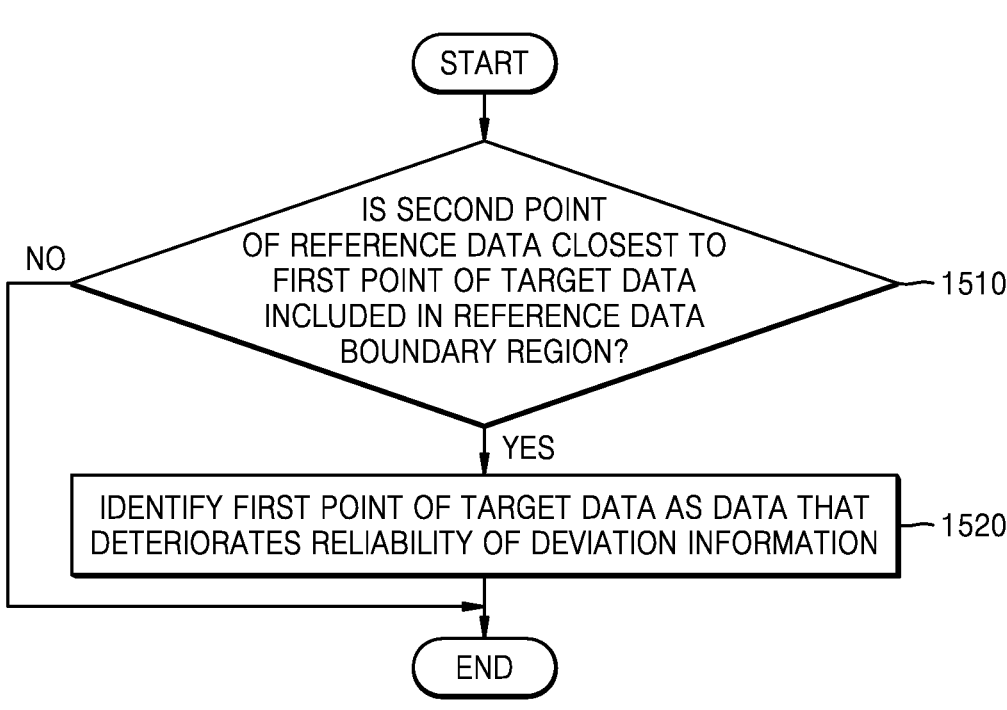
FIG. 15 is a flowchart illustrating a method of obtaining deviation information by using a shortest distance, according to an embodiment.

FIG. 15 is a flowchart illustrating a method of obtaining deviation information by using a shortest distance, according to an embodiment.

Referring to FIG. 15, the data processing device may identify whether a second point of reference data closest to a first point of target data is included in a reference data boundary region (operation 1510).

When the second point of the reference data is included in the reference data boundary region, the data processing device may identify the first point of the target data as data that deteriorates the reliability of deviation information (operation 1520).

When the second point of the reference data is not included in the reference data boundary region, the data processing device may use the first point of the target data to obtain deviation information without identifying the first point as data that deteriorates the reliability of the deviation information.

A data processing method according to an embodiment of the present disclosure may be embodied as program instructions executable by various computer devices, and then recorded on a computer-readable medium. In addition, an embodiment of the present disclosure may be implemented in a computer-readable recording medium having recorded thereon one or more programs including instructions for executing the data processing method.

A data processing method according to an embodiment of the present disclosure may include obtaining deviation information indicating a degree of deviation of target data from reference data, and displaying, on the target data, information corresponding to the deviation information, wherein the obtaining of the deviation information includes obtaining the deviation information by comparing data other than data that deteriorates reliability of the deviation information from among the target data with the reference data, and the data processing method may be implemented as a computer program product including a computer-readable recording medium having recorded thereon a program for causing a data processing device to perform the data processing method.

The computer-readable recording medium may include program instructions, data files, data structures, or the like separately or in combinations. Examples of the computer-readable recording medium may include magnetic media such as hard disks, floppy disks, or magnetic tapes, optical media such as a compact disc read-only memory (ROM) (CD-ROM) or a digital video discs (DVD), magneto-optical media such as floptical disks, and hardware devices such as ROM, random-access memory (RAM), and flash memory, which are configured to store and execute program instructions.

The machine-readable storage medium may be provided in the form of a non-transitory storage medium. The 'non-transitory storage medium' may mean that the storage medium is a tangible device. In addition, the 'non-transitory storage medium' may include a buffer in which data is temporarily stored.

According to an embodiment, the data processing method according to various embodiments disclosed herein may be provided in a computer program product. The computer program product may be distributed in the form of a machine-readable storage medium (e.g., a CD-ROM). Alternatively, the computer program product may be distributed (e.g., downloaded or uploaded) online through an application store (e.g., PlayStore™, etc.) or directly between two user devices (e.g., smart phones). In detail, the computer program product according to an embodiment of the present disclosure may include a storage medium having recorded thereon a program including at least one instruction for performing the data processing method according to an embodiment of the present disclosure.

Although embodiments have been described above in detail, the scope of the present disclosure is not limited thereto, and various modifications and alterations by those skill in the art using the basic concept of the present disclosure defined in the following claims also fall within the scope of the present disclosure.

The invention claimed is:

1. A data processing method for comparing three-dimensional scan data, the method comprising:
   aligning target data with reference data:
   obtaining deviation information indicating a degree of deviation of the target data from the reference data, according to a selected method for obtaining the deviation information; and
   displaying, on the target data, information corresponding to the deviation information,
   wherein the obtaining of the deviation information comprises;
   identifying, according to the selected method for obtaining the deviation information, data from among the target data that deteriorates reliability of the deviation information, and
   excluding the identified data and obtaining the deviation information by comparing the remaining data of the target data with the reference data,
   wherein the target data and the reference data are three-dimensional scan data of a same patient,
   wherein the selected method for obtaining the deviation information comprises at least one of a method using a normal vector and a method using a shortest distance, and
   wherein the method using the normal vector and the method using the shortest distance are configured to identify data deteriorating reliability of the deviation information in different ways.

2. The data processing method of claim 1, wherein, when the selected method for obtaining the deviation information is the method using the normal vector, the obtaining of the deviation information further comprises obtaining, as the deviation information, a distance to a second point of the reference data that intersects the normal vector, by projecting the normal vector from a first point of the target data.

3. The data processing method of claim 2, further comprising: identifying whether the first point is included in a target data boundary region; and based on the first point being included in the target data boundary region, identifying data of the first point as data that deteriorates the reliability of the deviation information.

4. The data processing method of claim 3, further comprising identifying whether the second point that intersects the normal vector is present in the reference data,
   wherein the identifying of whether the first point is included in the target data boundary region comprises,
   based on the second point being present in the reference data, identifying whether the first point is included in the target data boundary region.

5. The data processing method of claim 1, wherein, when the selected method for obtaining the deviation information is the method using the shortest distance, the obtaining of the deviation information further comprises obtaining, as the deviation information, a distance between the first point of the target data and a third point of the reference data that is at the shortest distance from the first point of the target data.

6. The data processing method of claim 5, wherein the obtaining of the deviation information further comprises:
   identifying whether the third point is included in a reference data boundary region; and
   based on the third point being included in the reference data boundary region, identifying data of the first point of the target data as the data that deteriorates the reliability of the deviation information.

7. The data processing method of claim 1, further comprising outputting a user interface screen for receiving a selection on whether to exclude the data that deteriorates the reliability of the deviation information, when obtaining the deviation information,
   wherein the obtaining of the deviation information further comprises, in response to receiving a selection to exclude the data that deteriorates the reliability of the deviation information on the user interface screen, excluding the data that deteriorates the reliability of the deviation information from the target data.

8. The data processing method of claim 1, further comprising outputting a user interface screen for receiving a selection for a method of obtaining the deviation information.

9. The data processing method of claim 1, wherein the deviation information comprises statistical properties of a distance distribution between the target data and the reference data, and
   the statistical properties of the distance distribution comprise at least one of a minimum, a maximum, a median, an average, an absolute average, a mode, a range, and a variance of the distance distribution.

10. The data processing method of claim 1, wherein the target data comprises a vertex,
   the displaying of the information corresponding to the deviation information on the target data comprises displaying each vertex of the target data used to obtain the deviation information in a color corresponding to the deviation information for the vertex, and
   the data processing method further comprises displaying a color of a vertex of the data that deteriorates the reliability of the deviation information in a predetermined color different from the color corresponding to the deviation information.

11. A data processing device for comparing three-dimensional scan data, the device comprising:
   a display;
   a memory storing one or more instructions; and a processor configured to execute the one or more instructions stored in the memory to align target data with reference data;

obtain deviation information indicating a degree of deviation of the target data from reference data, according to a selected method for obtaining the deviation information, identify, according to the selected method for obtaining the deviation information, data from among the target data that deteriorates reliability of the deviation information, exclude the identified data and obtain the deviation information by comparing the remaining data of the target data with the reference data, and control the display to display, on the target data, information corresponding to the deviation information, wherein the target data and the reference data are three-dimensional scan data of a same patient, wherein the method for obtaining the deviation information comprises at least one of a method using a normal vector and a method using a shortest distance, and wherein the method using the normal vector and the method using the shortest distance are configured to identify data deteriorating reliability of the deviation information in different ways.

12. The data processing device of claim 11, wherein the processor is further configured to execute the one or more instructions to project the normal vector from a first point of the target data, and obtain, as the deviation information, a distance to a second point of the reference data that intersects the normal vector.

13. The data processing device of claim 12, wherein, when the selected method for obtaining the deviation information is the method using the normal vector, the processor is further configured to execute the one or more instructions to identify whether the first point is included in a target data boundary region, and based on the first point being included in the target data boundary region, identify data of the first point as the data that deteriorates the reliability of the deviation information.

14. The data processing device of claim 13, wherein the processor is further configured to execute the one or more instructions to identify whether the second point that intersects the normal vector is present in the reference data, and based on the second point being present in the reference data, identify whether the first point is included in the target data boundary region.

15. The data processing device of claim 11, wherein, when the selected method for obtaining the deviation information is the method using the shortest distance, the processor is further configured to execute the one or more instructions to obtain, as the deviation information, a distance between the first point of the target data and a third point of the reference data that is at the shortest distance from the first point of the target data.

16. The data processing device of claim 15, wherein the processor is further configured to execute the one or more instructions to identify whether the third point is included in the reference data boundary region, and based on the third point being included in the reference data boundary region, identify data of the first point of the target data as the data that deteriorates the reliability of the deviation information.

17. The data processing device of claim 11, further comprising a user input portion, wherein the display is configured to output a user interface screen for receiving a selection on whether to exclude the data that deteriorates the reliability of the deviation information, when obtaining the deviation information, and the processor is further configured to execute the one or more instructions to, in response to receiving a selection to exclude the data that deteriorates the reliability of the deviation information on the user interface screen through the user input portion, exclude the data that deteriorates the reliability of the deviation information from the target data.

18. The data processing device of claim 11, further comprising a user input portion, wherein the display is configured to output a user interface screen for receiving a selection for a method of obtaining the deviation information.

19. The data processing device of claim 11, wherein the target data comprises a vertex, and the processor is further configured to execute the one or more instructions to display each vertex of the target data used to obtain the deviation information in a color corresponding to the deviation information for the vertex, and display a color of a vertex of the data that deteriorates the reliability of the deviation information in a predetermined color different from the color corresponding to the deviation information.

20. A non-transitory computer-readable recording medium having recorded thereon a program for executing a data processing method, the data processing method comprising:

aligning target data with reference data;

obtaining deviation information indicating a degree of deviation of the target data from the reference data, according to a selected method for obtaining the deviation information; and displaying, on the target data, information corresponding to the deviation information, wherein the obtaining of the deviation information comprises:

identifying, according to the selected method for obtaining the deviation information, data from among the target data that deteriorates reliability of the deviation information, and excluding the identified data and obtaining the deviation information by comparing the remaining data of the target data with the reference data, wherein the target data and the reference data are three-dimensional scan data of a same patient, wherein the method for obtaining the deviation information comprises at least one of a method using a normal vector and a method using a shortest distance, and wherein the method using the normal vector and the method using the shortest distance are configured to identify data deteriorating reliability of the deviation information in different way.

* * * * *